United States Patent
Gao et al.

(10) Patent No.: US 12,445,183 B2
(45) Date of Patent: *Oct. 14, 2025

(54) COMMUNICATION METHOD AND DEVICE

(71) Applicant: HUAWEI TECHNOLOGIES CO., LTD., Guangdong (CN)

(72) Inventors: Xiang Gao, Beijing (CN); Kunpeng Liu, Beijing (CN); Ruiqi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,988

(22) Filed: Apr. 2, 2024

(65) Prior Publication Data

US 2024/0275462 A1    Aug. 15, 2024

Related U.S. Application Data

(63) Continuation of application No. 17/371,978, filed on Jul. 9, 2021, now Pat. No. 11,962,381, which is a
(Continued)

(30) Foreign Application Priority Data

Jan. 11, 2019 (CN) .......................... 201910028819.1
Apr. 30, 2019 (CN) .......................... 201910364435.7

(51) Int. Cl.
*H04B 7/06* (2006.01)
*H04W 72/02* (2009.01)
(Continued)

(52) U.S. Cl.
CPC ......... *H04B 7/0634* (2013.01); *H04B 7/0639* (2013.01); *H04W 72/02* (2013.01); *H04W 72/0453* (2013.01); *H04W 72/046* (2013.01)

(58) Field of Classification Search
CPC .. H04B 7/0634; H04B 7/0639; H04B 7/0456; H04W 72/02; H04W 72/0453; H04W 72/046
See application file for complete search history.

(56) References Cited

U.S. PATENT DOCUMENTS

| 11,962,381 B2* | 4/2024 | Gao ..................... H04B 7/0634 |
| 2004/0170305 A1* | 9/2004 | Kim ..................... G06V 40/169 |
| | | 382/118 |

(Continued)

FOREIGN PATENT DOCUMENTS

| CN | 107577872 A | 1/2018 |
| CN | 107682054 A | 2/2018 |

(Continued)

OTHER PUBLICATIONS

Huawei et al., "Codebook Subset Restriction in advanced CSI," 3GPP TSG RAN WG1 Meeting #91, R1-1721065, Reno, USA, Nov. 27-Dec. 1, 2017, 6 pages.

(Continued)

*Primary Examiner* — Christine Ng
(74) *Attorney, Agent, or Firm* — Fish & Richardson P.C.

(57) ABSTRACT

Examples of communication methods and devices are described. In one example method, configuration information indicating one or more spatial domain beam basis vector groups and Q thresholds is received from a network device, where the Q thresholds correspond one-to-one to spatial domain beam basis vectors in the one or more spatial domain beam basis vector groups. L spatial domain beam basis vectors are selected from a spatial domain beam basis vector group set. K frequency domain basis vectors are selected from a frequency domain basis vector set for each of the L spatial domain beam basis vectors.

20 Claims, 5 Drawing Sheets

Related U.S. Application Data continuation of application No. PCT/CN2020/071604, filed on Jan. 11, 2020.

(51) Int. Cl.
*H04W 72/044* (2023.01)
*H04W 72/0453* (2023.01)

(56) References Cited

U.S. PATENT DOCUMENTS

| | | | | |
|---|---|---|---|---|
| 2004/0189999 | A1* | 9/2004 | De Groot | G01B 11/0675 |
| | | | | 356/497 |
| 2006/0093037 | A1* | 5/2006 | Enomoto | H04N 21/4312 |
| | | | | 375/E7.193 |
| 2012/0077542 | A1* | 3/2012 | Rhoads | H04N 1/32187 |
| | | | | 455/556.1 |
| 2012/0281657 | A1* | 11/2012 | Ding | H04W 72/27 |
| | | | | 370/329 |
| 2016/0105870 | A1 | 4/2016 | Won et al. | |
| 2018/0048378 | A1 | 2/2018 | Kotecha et al. | |
| 2020/0028555 | A1* | 1/2020 | Rahman | H04W 80/08 |
| 2022/0052734 | A1* | 2/2022 | Faxer | H04B 7/0645 |

FOREIGN PATENT DOCUMENTS

| | | |
|---|---|---|
| CN | 107888323 A | 4/2018 |
| CN | 108288983 A | 7/2018 |
| CN | 108390704 A | 8/2018 |
| CN | 108418612 A | 8/2018 |
| CN | 109167747 A | 1/2019 |
| RU | 2430470 C1 | 9/2011 |
| WO | 2017196098 A1 | 11/2017 |
| WO | 2018127142 A1 | 7/2018 |

OTHER PUBLICATIONS

3GPP TS 38.214 V15.3.0 (Sep. 2018), "3rd Generation Partnership Project; Technical Specification Group Radio Access Network; NR; Physical layer procedures for data (Release 15)," Sep. 2018, 96 pages.
Office Action in Chinese Application No. 201910364435.7, dated Nov. 27, 2020, 14 pages.
PCT International Search Report and Written Opinion in International Application No. PCT/CN2020/071604, dated Apr. 13, 2020, 15 pages.
Office Action issued in Chinese Application No. 202011563987.X on Sep. 10, 2021, 11 pages (with English translation).
Ericsson, "On Advanced CSI codebook subset restriction," 3GPP TSG RAN WG1 Meeting #92, R1-1802733, Athens, Greece, Feb. 26-Mar. 2, 2018, 8 pages.
Extended European Search Report issued in European Application No. 20738278.9 on Feb. 17, 2022, 7 pages.
Huawei et al., "Codebook Subset Restriction," 3GPP TSG RAN WG1 Meeting AH NR#3, R1-1715594, Nagoya, Japan, Sep. 18-21, 2017, 11 pages.
MCC Support, "Draft Report of 3GPP TSG RAN WG1 #95 v0.2.0 (Spokane, USA, Nov. 12-16, 2018)," 3GPP TSG RAN WG1 Meeting #96, R1-190xxx, Athens, USA, Feb. 25-Mar. 1, 2019, 170 pages.
Samsung, "Summary of CSI enhancement for MU-MIMO support," 3GPP TSG RAN WG1 Meeting #95, R1-1813002, Spokane, USA, Nov. 12-16, 2018, 9 pages.
Office Action in Russian Appln. No. 2021123665, dated Nov. 9, 2022, 16 pages (with English translation).
Huawei et al., "Codebook Subset Restriction in advanced CSI," 3GPP TSG RAN WG1 Meeting #91, R1-1720764, Reno, USA, Nov. 27-Dec. 1, 2017, 6 pages.
Office Action in Korean Appln. No. 10-2021-7025258, dated Feb. 8, 2023, 12 pages (with English translation).

* cited by examiner

COMMUNICATION METHOD AND DEVICE

CROSS-REFERENCE TO RELATED APPLICATIONS

This application is a continuation of U.S. patent application Ser. No. 17/371,978, filed on Jul. 9, 2021, which is a continuation of International Application No. PCT/CN2020/071604, filed on Jan. 11, 2020, which claims priority to Chinese Patent Application No. 201910364435.7, filed on Apr. 30, 2019, and Chinese Patent Application No. 201910028819.1, filed on Jan. 11, 2019. All of the aforementioned patent applications are hereby incorporated by reference in their entireties.

TECHNICAL FIELD

Embodiments of the present invention relate to the field of communications technologies, and in particular, to a communication method and a device.

BACKGROUND

A multiple-input multiple-output (MIMO) technology means that a signal is sent through a plurality of transmit antennas at a transmit end and is received through a plurality of receive antennas at a receive end, to improve communication quality. In a MIMO system, to improve signal transmission performance and a system capacity, a network device needs to determine an optimal precoding vector based on downlink channel state information (CSI), to precode (precoding) downlink data. For a time division multiplexing (TDD) MIMO system, because of uplink and downlink reciprocity of a radio channel, a downlink precoding vector may be estimated based on an uplink channel. For a frequency division multiplexing (FDD) MIMO system, due to a difference between an uplink frequency band and a downlink frequency band, a downlink precoding vector cannot be estimated based on an uplink channel. In an existing wireless communications system, a downlink precoding vector is usually obtained by feeding back a precoding vector or a precoding matrix indication (PMI) by a terminal device. A precoding vector is formed by performing linear combination on a plurality of orthogonal spatial domain beam vectors. When reporting the PMI to a network device, the terminal device needs to determine selected spatial domain beams. If powers of the selected spatial domain beams are relatively high, and the spatial domain beams point to a neighboring cell, relatively strong interference is caused to the neighboring cell when the network device sends downlink data to the terminal device by using the spatial domain beams, and consequently, system performance is reduced.

SUMMARY

Embodiments of the present invention disclose a communication method and a device, to improve system performance.

According to a first aspect, a communication method is disclosed. Configuration information indicating one or more spatial domain beam basis vector groups and Q thresholds is received from a network device. L spatial domain beam basis vectors are selected from a spatial domain beam basis vector group set. K frequency domain basis vectors are selected from a frequency domain basis vector set for each of the L spatial domain beam basis vectors. M spatial-frequency combination coefficient vectors are determined based on the L spatial domain beam basis vectors, the K frequency domain basis vectors corresponding to each of the L spatial domain beam basis vectors, and a target precoding vector. Amplitudes and phases of spatial-frequency combination coefficients in the M spatial-frequency combination coefficient vectors are sent to the network device. The Q thresholds correspond one-to-one to spatial domain beam basis vectors in the one or more spatial domain beam basis vector groups. One spatial-frequency combination coefficient vector corresponds to one spatial domain beam basis vector. The spatial-frequency combination coefficient vector corresponding to the spatial domain beam basis vector satisfies a restriction rule, and the restriction rule is associated with the threshold corresponding to the spatial domain beam basis vector. It can be learned that when the one or more spatial domain beam basis vector groups include the L spatial domain beam basis vectors, the spatial-frequency combination coefficients in the M spatial-frequency combination coefficient vectors need to satisfy corresponding restriction rules. Therefore, amplitudes or powers of spatial-frequency combination coefficients corresponding to a spatial domain beam basis vector may be restricted to restrict energy corresponding to the spatial domain beam vector, to reduce interference, to a neighboring cell, caused by communication between a terminal device and the network device, thereby improving system performance.

In an embodiment, the restriction rule may be that a value of a power function of spatial-frequency combination coefficients included in a spatial-frequency combination coefficient vector corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups. It can be learned that the powers of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the restriction rule is that a value of a power function of spatial-frequency combination coefficients corresponding to a first spatial domain beam basis vector needs to be less than or equal to a square of a threshold corresponding to the first spatial domain beam basis vector, and the first spatial domain beam basis vector is any spatial domain beam basis vector in the one or more spatial domain beam basis vector groups. It can be learned that the powers of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the restriction rule is that a value of a power function of spatial-frequency combination coefficients corresponding to a first spatial domain beam basis vector needs to be less than or equal to a linear combination of a fixed value and a square of a threshold corresponding to the first spatial domain beam basis vector, and the first spatial domain beam basis vector is any spatial domain beam basis vector in the one or more spatial domain beam basis vector groups. It can be learned that the powers of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the power function may be a ratio of a first power to a second power, the first power may be a power sum of the spatial-frequency combination coefficients corresponding to the first spatial domain beam basis vector, and the second power may be a largest value of power sums of spatial-frequency combination coefficients corresponding to each of M spatial domain beam basis vectors.

In an embodiment, the power function may be a power sum of the spatial-frequency combination coefficients corresponding to the first spatial domain beam basis vector.

In an embodiment, powers of the spatial-frequency combination coefficients corresponding to the first spatial domain beam basis vector may be squares of amplitudes of the spatial-frequency combination coefficients corresponding to the first spatial domain beam basis vector.

In an embodiment, the threshold corresponding to the first spatial domain beam basis vector is 0, $\sqrt{1/4}$, $\sqrt{1/2}$, or 1.

In an embodiment, the threshold corresponding to the first spatial domain beam basis vector is 0, $\sqrt{1/4}$, $\sqrt{1/2}$, or 1.

In an embodiment, the restriction rule may be that a value of an amplitude function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups. It can be learned that the amplitudes of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the amplitude function is a largest value of amplitudes of the spatial-frequency combination coefficients corresponding to the first spatial domain beam basis vector.

In an embodiment, an amplitude of a first spatial-frequency combination coefficient may be a product of a reference amplitude and a differential amplitude; the reference amplitude may be a largest value of quantized amplitudes of spatial-frequency combination coefficients, in a first polarization direction, corresponding to the first spatial domain beam basis vector; the differential amplitude may be a ratio of a quantized amplitude of the first spatial-frequency combination coefficient to the reference amplitude; the first spatial-frequency combination coefficient is any one of the spatial-frequency combination coefficients, in the first polarization direction, corresponding to the first spatial domain beam basis vector; and the first polarization direction is any one of polarization directions of the first spatial domain beam basis vector.

In an embodiment, the amplitude function may be a largest value of quantized amplitudes of spatial-frequency combination coefficients, in a first polarization direction, corresponding to the first spatial domain beam basis vector, and the first polarization direction is any one of polarization directions of the first spatial domain beam basis vector.

In an embodiment, one group of spatial domain beam basis vectors may be selected from the spatial domain beam basis vector group set, and the L spatial domain beam basis vectors are selected from the group of spatial domain beam basis vectors.

In an embodiment, when all the spatial-frequency combination coefficients are reported, M initial spatial-frequency combination coefficient vectors may be determined based on the L spatial domain beam basis vectors, the K frequency domain basis vectors corresponding to each of the L spatial domain beam basis vectors, and the target precoding vector. When the one or more spatial domain beam basis vector groups do not include the group of spatial domain beam basis vectors, the M initial spatial-frequency combination coefficient vectors may be determined as the M spatial-frequency combination coefficient vectors. M is equal to L.

In an embodiment, when only a part of the spatial-frequency combination coefficients are reported, L initial spatial-frequency combination coefficient vectors may be determined based on the L spatial domain beam basis vectors, the K frequency domain basis vectors corresponding to each of the L spatial domain beam basis vectors, and the target precoding vector. Then, a part of spatial-frequency combination coefficients are selected from the L initial spatial-frequency combination coefficient vectors to obtain M initial spatial-frequency combination coefficient vectors. When the one or more spatial domain beam basis vector groups do not include the group of spatial domain beam basis vectors, the M initial spatial-frequency combination coefficient vectors are determined as the M spatial-frequency combination coefficient vectors. M is less than or equal to L, and a quantity of spatial-frequency combination coefficients included in each of the M initial spatial-frequency combination coefficient vectors is less than or equal to a quantity of spatial-frequency combination coefficients included in a corresponding initial spatial-frequency combination coefficient vector in the L initial spatial-frequency combination coefficient vectors.

In an embodiment, when the one or more spatial domain beam basis vector groups include the group of spatial domain beam basis vectors, and spatial-frequency combination coefficients in the M initial spatial-frequency combination coefficient vectors all satisfy corresponding restriction rules, the M initial spatial-frequency combination coefficient vectors are determined as the M spatial-frequency combination coefficient vectors. It can be learned that when the one or more spatial domain beam basis vector groups include the L spatial domain beam basis vectors, the spatial-frequency combination coefficients in the M spatial-frequency combination coefficient vectors need to satisfy the corresponding restriction rules. Therefore, the amplitudes or the powers the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, when the one or more spatial domain beam basis vector groups include the group of spatial domain beam basis vectors, and there is a spatial-frequency combination coefficient, in the M initial spatial-frequency combination coefficient vectors, not satisfying a corresponding restriction rule, an amplitude of the spatial-frequency combination coefficient not satisfying the restriction rule may be adjusted, to obtain the M spatial-frequency combination coefficient vectors. It can be learned that when the one or more spatial domain beam basis vector groups include the L spatial domain beam basis vectors, the spatial-frequency combination coefficients in the M spatial-frequency combination coefficient vectors may satisfy the corresponding restriction rules through amplitude adjustment. Therefore, the amplitudes or the powers the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, when the one or more spatial domain beam basis vector groups include the group of spatial domain beam basis vectors, and there is a spatial-frequency combination coefficient, in the M initial spatial-frequency combination coefficient vectors, not satisfying a corresponding restriction rule, a spatial domain beam basis vector not satisfying the corresponding restriction rule may be replaced with a spatial domain beam basis vector reselected from the spatial domain beam basis vector group set, to obtain new L spatial domain beam basis vectors. K frequency domain basis vectors are selected from the frequency domain basis vector set for each of the L spatial domain beam basis vectors, and M spatial-frequency combination coefficient vectors are determined based on the L spatial domain beam basis vectors, the K frequency domain basis vectors corresponding to each of the L spatial domain beam basis vectors, and the target precoding vector. It can be learned that when the one or more spatial domain beam basis vector groups include the L spatial domain beam basis vectors, the spatial-frequency combination coefficients in the M spatial-frequency combination coefficient vectors need to satisfy the corresponding restriction rules. Therefore, the amplitudes or the powers of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the configuration information may further indicate a quantity of spatial-frequency combination coefficients, and a quantity of spatial-frequency combination coefficients included in the M spatial-frequency combination coefficient vectors is equal to the quantity of spatial-frequency combination coefficients. It can be learned that a quantity of spatial-frequency combination coefficients included in the part, of the spatial-frequency combination coefficients, needing to be reported by the terminal device may be configured by the network device.

In an embodiment, the amplitudes and the phases of the spatial-frequency combination coefficients in the M spatial-frequency combination coefficient vectors and a quantity of spatial-frequency combination coefficients included in the M spatial-frequency combination coefficient vectors may be sent to the network device. It can be learned that a quantity of spatial-frequency combination coefficients included in the part, of the spatial-frequency combination coefficients, needing to be reported by the terminal device may be determined and reported by the terminal device.

In an embodiment, the amplitudes and the phases of the spatial-frequency combination coefficients in the M spatial-frequency combination coefficient vectors, basis vector indexes of the L spatial domain beam basis vectors, and basis vector indexes of the K frequency domain basis vectors corresponding to each of the L spatial domain beam basis vectors may be sent to the network device.

According to a second aspect, a communication method is disclosed. Configuration information indicating one or more spatial domain beam basis vector groups and Q thresholds is sent to a terminal device. Amplitudes and phases of spatial-frequency combination coefficients in M spatial-frequency combination coefficient vectors are received from the terminal device. The Q thresholds correspond one-to-one to spatial domain beam basis vectors in the one or more spatial domain beam basis vector groups. The M spatial-frequency combination coefficient vectors are determined based on L spatial domain beam basis vectors, K frequency domain basis vectors corresponding to each of the L spatial domain beam basis vectors, and a target precoding vector. The L spatial domain beam basis vectors are selected from a spatial domain beam basis vector group set. The K frequency domain basis vectors are selected from a frequency domain basis vector set. One spatial-frequency combination coefficient vector corresponds to one spatial domain beam basis vector. The spatial-frequency combination coefficient vector corresponding to the spatial domain beam basis vector satisfies a restriction rule, and the restriction rule is associated with the threshold corresponding to the spatial domain beam basis vector. It can be learned that when the one or more spatial domain beam basis vector groups include the L spatial domain beam basis vectors, the spatial-frequency combination coefficients in the M spatial-frequency combination coefficient vectors need to satisfy corresponding restriction rules. Therefore, amplitudes or powers of spatial-frequency combination coefficients corresponding to a spatial domain beam basis vector may be restricted to restrict energy corresponding to the spatial domain beam vector, to reduce interference, to a neighboring cell, caused by communication between the terminal device and a network device, thereby improving system performance.

In an embodiment, the restriction rule may be that a value of a power function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups. It can be learned that the powers of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the restriction rule is that a value of a power function of spatial-frequency combination coefficients corresponding to a first spatial domain beam basis vector needs to be less than or equal to a square of a threshold corresponding to the first spatial domain beam basis vector, and the first spatial domain beam basis vector is any spatial domain beam basis vector in the one or more spatial domain beam basis vector groups. It can be learned that the powers of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the restriction rule is that a value of a power function of spatial-frequency combination coefficients corresponding to a first spatial domain beam basis vector needs to be less than or equal to a linear combination of a fixed value and a square of a threshold corresponding to the first spatial domain beam basis vector, and the first spatial domain beam basis vector is any spatial domain beam basis vector in the one or more spatial domain beam basis vector groups. It can be learned that the powers of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the power function may be a ratio of a first power to a second power, the first power may be a power sum of the spatial-frequency combination coefficients corresponding to the first spatial domain beam basis vector, and the second power may be a largest value of power sums of spatial-frequency combination coefficients corresponding to each of M spatial domain beam basis vectors.

In an embodiment, the power function may be a power sum of the spatial-frequency combination coefficients corresponding to the first spatial domain beam basis vector.

In an embodiment, powers of the spatial-frequency combination coefficients corresponding to the first spatial domain beam basis vector may be squares of amplitudes of the spatial-frequency combination coefficient corresponding to the first spatial domain beam basis vector.

In an embodiment, the threshold corresponding to the first spatial domain beam basis vector is 0, $\sqrt{1/4}$, $\sqrt{1/2}$, or 1.

In an embodiment, the threshold corresponding to the first spatial domain beam basis vector is 0, $\sqrt{1/4}$, $\sqrt{1/2}$, or 1.

In an embodiment, the restriction rule may be that a value of an amplitude function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups. It can be learned that the amplitudes of the spatial-frequency combination coefficients corresponding to the spatial domain beam basis vector may be restricted to restrict the energy corresponding to the spatial domain beam vector, to reduce the interference, to the neighboring cell, caused by the communication between the terminal device and the network device, thereby improving the system performance.

In an embodiment, the amplitude function is a largest value of amplitudes of the spatial-frequency combination coefficients corresponding to the first spatial domain beam basis vector.

In an embodiment, an amplitude of a first spatial-frequency combination coefficient may be a product of a reference amplitude and a differential amplitude; the reference amplitude may be a largest value of quantized amplitudes of spatial-frequency combination coefficients, in a first polarization direction, corresponding to the first spatial domain beam basis vector; the differential amplitude may be a ratio of a quantized amplitude of the first spatial-frequency combination coefficient to the reference amplitude; the first spatial-frequency combination coefficient is any one of the spatial-frequency combination coefficients, in the first polarization direction, corresponding to the first spatial domain beam basis vector; and the first polarization direction is any one of polarization directions of the first spatial domain beam basis vector.

In an embodiment, the amplitude function may be a largest value of quantized amplitudes of spatial-frequency combination coefficients, in a first polarization direction, corresponding to the first spatial domain beam basis vector, and the first polarization direction is any one of polarization directions of the first spatial domain beam basis vector.

In an embodiment, when the terminal device reports only a part of the spatial-frequency combination coefficients, the configuration information may further indicate a quantity of spatial-frequency combination coefficients, and a quantity of spatial-frequency combination coefficients included in the M spatial-frequency combination coefficient vectors is equal to the quantity of spatial-frequency combination coefficients. It can be learned that a quantity of spatial-frequency combination coefficients included in the part, of the spatial-frequency combination coefficients, needing to be reported by the terminal device may be configured by the network device.

In an embodiment, when the terminal device reports only a part of the spatial-frequency combination coefficients, the amplitudes and the phases of the spatial-frequency combination coefficients in the M spatial-frequency combination coefficient vectors and a quantity of spatial-frequency combination coefficients included in the M spatial-frequency combination coefficient vectors may be received from the terminal device. It can be learned that a quantity of spatial-frequency combination coefficients included in the part, of the spatial-frequency combination coefficients, needing to be reported by the terminal device may be determined and reported by the terminal device.

In an embodiment, the amplitudes and the phases of the spatial-frequency combination coefficients in the M spatial-frequency combination coefficient vectors, basis vector indexes of the L spatial domain beam basis vectors, and basis vector indexes of the K frequency domain basis vectors corresponding to each of the L spatial domain beam basis vectors may be received from the terminal device.

According to a third aspect, a communications apparatus is disclosed. The communications apparatus includes a unit configured to perform the communication method according to any one of the first aspect or the embodiments of the first aspect, or includes a unit configured to perform the communication method according to any one of the second aspect or the embodiments of the second aspect.

According to a fourth aspect, a communications apparatus is disclosed. The communications apparatus may be a terminal device or a chip in a terminal device. The communications apparatus may include a processor, the processor is coupled to a memory, and the memory is configured to store a computer program or an instruction. The processor is configured to execute the computer program or the instruction stored in the memory, to enable the communications apparatus to perform the communication method according to the first aspect.

According to a fifth aspect, a communications apparatus is disclosed. The communications apparatus may be a network device or a chip in a network device. The communications apparatus may include a processor, the processor is coupled to a memory, and the memory is configured to store a computer program or an instruction. The processor is configured to execute the computer program or the instruction stored in the memory, to enable the communications apparatus to perform the communication method according to the second aspect.

According to a sixth aspect, a computer storage medium is disclosed. The computer storage medium is configured to store a computer program or an instruction. When the computer program or the instruction is executed, the communication method according to the first aspect or the second aspect is performed.

According to a seventh aspect, a computer program product is provided. The computer program product includes computer program code. When the computer program code is run, the communication method according to the first aspect or the second aspect is performed.

According to an eighth aspect, a communications system is disclosed. The communications system includes the communications apparatus according to the fourth aspect and the communications apparatus according to the fifth aspect.

DESCRIPTION OF EMBODIMENTS

Embodiments of the present invention disclose a communication method and a device, to improve system performance. The following separately provides detailed descriptions.

Figure 1:
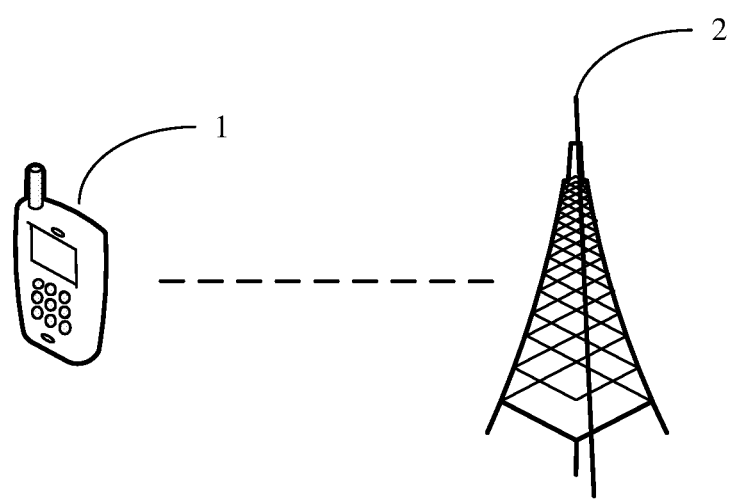
FIG. 1 is a schematic diagram of a network architecture according to an embodiment of the present invention.

To better understand the communication method and the device that are disclosed in the embodiments of the present invention, the following first describes a network architecture used in the embodiments of the present invention. FIG. 1 is a schematic diagram of a network architecture according to an embodiment of the present invention. As shown in FIG. 1, the network architecture may include one or more terminal devices 1 (where one terminal device is shown in FIG. 1) and one or more network devices 2 (where one network device is shown in FIG. 1). A MIMO system includes the terminal device 1 and the network device 2.

Communication between the terminal device 1 and the network device 2 includes uplink communication (that is, communication from the terminal device 1 to the network device 2) and downlink communication (that is, communication from the network device 2 to the terminal device 1). In the uplink communication, the terminal device 1 is configured to send an uplink signal to the network device 2; and the network device 2 is configured to receive the uplink signal from the terminal device 1. In the downlink communication, the network device 2 is configured to send a downlink signal to the terminal device 1; and the terminal device 1 is configured to receive the downlink signal from the network device 2.

The terminal device 1 may be user equipment (UE), customer-premises equipment (CPE), an access terminal, a UE unit, a UE station, a mobile station, a mobile station, a remote station, a remote terminal, a mobile device, a UE terminal, a terminal, a wireless communications device, a UE agent, a UE apparatus, or the like. The access terminal may be a cellular phone, a cordless telephone set, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal in a future 5G network, a terminal in a future evolved public land mobile network (PLMN) network, or the like.

The network device 2 is a device that can communicate with the terminal device 1, and may be a base station, a relay station, or an access point. The base station may be a base transceiver station (BTS) in a global system for mobile communications (GSM) network or a code division multiple access (CDMA) network, a NodeB (NB) in a wideband code division multiple access (WCDMA) network, an evolved (evolutional) NB (eNB or eNodeB) in a long term evolution (LTE) network, or a radio controller in a cloud radio access network (CRAN) scenario. Alternatively, the base station may be a base station device in the future 5G network, or a network device in the future evolved PLMN network, or may be a wearable device or a vehicle-mounted device.

To better understand the communication method and the device that are disclosed in the embodiments of the present invention, the following first describes an application scenario in the embodiments of the present invention. A high-resolution codebook, that is, a Type (Type) II codebook, may be formed by performing linear combination on a plurality of selected orthogonal spatial domain beam (beam) basis vectors. The spatial domain beam basis vector may be referred to as a beam basis vector, a spatial domain basis vector, and a beam. When an uncompressed codebook structure (a rank 2 structure) is used, for a PMI frequency domain unit, a precoding vector W (having a dimension of $2N_1N_2 \times N_1$.) corresponding to one spatial layer may be represented as follows:

$$W = W_1 \times W_2$$

A frequency domain length occupied by the PMI frequency domain unit may be a bandwidth of a frequency domain subband, may be R times a bandwidth of a frequency domain subband, or may be one resource block (RB), two RBs, or four RBs. R may be ½, ¼, or another value. $N_1$ represents a quantity of antenna ports in a horizontal direction, $N_2$ represents a quantity of antenna ports in a vertical direction, and NL represents a quantity of spatial layers. $W_1$ is a $2N_1N_2 \times L$ spatial domain beam matrix, may be a dual-polarized rotated 2D (2-dimensional) discrete Fourier transform (DFT) basis matrix, and includes L spatial domain beam vectors in total. Same L/2 spatial domain beam basis vectors are used in two polarization directions. $W_1$ may be represented as follows:

$$W_1 = \begin{bmatrix} b_{I_S(0)} & b_{I_S(1)} & \cdots & b_{I_S(L/2-1)} & 0 & 0 & \cdots & 0 \\ 0 & 0 & \cdots & 0 & b_{I_S(0)} & b_{I_S(1)} & \cdots & b_{I_S(L/2-1)} \end{bmatrix}$$

$b_{I_S(i)}$ is a spatial domain beam basis vector selected from an oversampled 2D DFT basis matrix (that is, a rotated 2D DFT basis matrix), and $I_S(i)$ is an index of an $i^{th}$ selected spatial domain beam basis vector, where i=0, 1, ..., or L/2−1. The rotated DFT basis matrix may be represented as follows:

$$B_{N_1,N_2}(q_1, q_2) = (R_{N_1}(q_1)D_{N_1}) \otimes (R_{N_2}(q_2)D_{N_2}) = [b_0 \ b_1 \ \ldots \ b_{N_1 N_2-1}]$$

$R_N$ is an N×N rotation matrix, and may be represented as follows:

$$R_N(q) = \text{diag}([1 \ e^{j2\pi \cdot 1 \cdot \frac{q}{NO}} \ \ldots \ e^{j2\pi \cdot (N-1) \cdot \frac{q}{NO}}])$$

$D_N$ is an N×N orthogonal DFT matrix, and $D_N$ in an $m^{th}$ row and $n^{th}$ column may be represented as follows:

$$[D_N]_{m,n} = \frac{1}{\sqrt{N}} e^{\frac{j2\pi mn}{N}}$$

⊗ represents a Kronecker product. Assuming that rotation factors q are evenly distributed, $q_1=0, 1, \ldots,$ or $O_1-1$, and $q_2=0, 1, \ldots,$ or $O_2-1$. $O_1$ and $O_2$ are oversampling factors. A matrix formed by a product of the rotation matrix and the orthogonal DFT matrix satisfies $$[R_N(q)D_N]_{m,n} = \frac{1}{\sqrt{N}} e^{\frac{j2\pi m(On+q)}{NO}}.$$

A corresponding rotated DFT basis matrix $B_{N_1, N_2}(q_1, q_2)$ may be determined based on a group of values of $q_1$ and $q_2$, and each column vector in the rotated DFT basis matrix $B_{N_1, N_2}(q_1, q_2)$ constitutes a group of orthogonal spatial domain beam basis vectors. All value combinations of $(q_1, q_2)$ form a spatial domain beam basis vector group set. When the L/2 spatial domain beam basis vectors are selected, the values of $q_1$ and $q_2$ are first determined. In this way, one group $B_{N_1, N_2}(q_1, q_2)$ of spatial domain beam basis vectors is selected from the spatial domain beam basis vector group set, and then the L/2 spatial domain beam basis vectors are selected from the selected group $B_{N_1, N_2}(q_1, q_2)$ of spatial domain beam basis vectors. $W_2$ is a combination coefficient matrix, and is combination coefficients corresponding to the L spatial domain beam basis vectors in $W_1$. When the quantity of spatial layers (that is, a quantity of data streams that can be simultaneously sent) is 1, $W_2$ may be represented as follows:

$$W_2 = \begin{bmatrix} p_{0,0,0}^{(1)} p_{0,0,0}^{(2)} \varphi_{0,0,0} \\ p_{0,0,1}^{(1)} p_{0,0,1}^{(2)} \varphi_{0,0,1} \\ \vdots \\ p_{0,0,L/2-1}^{(1)} p_{0,0,L/2-1}^{(2)} \varphi_{0,0,L/2-1} \\ p_{1,0,0}^{(1)} p_{1,0,0}^{(2)} \varphi_{1,0,0} \\ p_{1,0,1}^{(1)} p_{1,0,1}^{(2)} \varphi_{1,0,1} \\ \vdots \\ p_{1,0,L/2-1}^{(1)} p_{1,0,L/2-1}^{(2)} \varphi_{1,0,L/2-1} \end{bmatrix}$$

When the quantity of spatial layers is 2, $W_2$ may be represented as follows:

$$W_2 = \begin{bmatrix} p_{0,0,0}^{(1)} p_{0,0,0}^{(2)} \varphi_{0,0,0} & p_{0,1,0}^{(1)} p_{0,1,0}^{(2)} \varphi_{0,1,0} \\ p_{0,0,1}^{(1)} p_{0,0,1}^{(2)} \varphi_{0,0,1} & p_{0,1,1}^{(1)} p_{0,1,1}^{(2)} \varphi_{0,1,1} \\ \vdots & \vdots \\ p_{0,0,L/2-1}^{(1)} p_{0,0,L/2-1}^{(2)} \varphi_{0,0,L/2-1} & p_{0,1,L/2-1}^{(1)} p_{0,1,L/2-1}^{(2)} \varphi_{0,1,L/2-1} \\ p_{1,0,0}^{(1)} p_{1,0,0}^{(2)} \varphi_{1,0,0} & p_{1,1,0}^{(1)} p_{1,1,0}^{(2)} \varphi_{1,1,0} \\ p_{1,0,1}^{(1)} p_{1,0,1}^{(2)} \varphi_{1,0,1} & p_{1,1,1}^{(1)} p_{1,1,1}^{(2)} \varphi_{1,1,1} \\ \vdots & \vdots \\ p_{1,0,L/2-1}^{(1)} p_{1,0,L/2-1}^{(2)} \varphi_{1,0,L/2-1} & p_{1,1,L/2-1}^{(1)} p_{1,1,L/2-1}^{(2)} \varphi_{1,1,L/2-1} \end{bmatrix}$$

$p_{i,j,k}^{(1)}$ is a wideband amplitude of a combination coefficient corresponding to an $i^{th}$ polarization direction, a $j^{th}$ layer, and a $k^{th}$ beam, and $p_{i,j,k}^{(2)}$ is a subband differential amplitude of the combination coefficient corresponding to the $i^{th}$ polarization direction, the $j^{th}$ layer, and the $k^{th}$ beam. The wideband amplitude is an average value of amplitude values of combination coefficients corresponding to all PMI frequency domain units for which PMIs need to be reported, and the same wideband amplitude is used for all the PMI frequency domain units. The subband differential amplitude is a difference, from the wideband amplitude, of an amplitude of the combination coefficient corresponding to each PMI frequency domain unit. When $p_{i,j,k}^{(1)}$ is quantized by using three bits (bits), $p_{i,j,k}^{(1)} \in \{0, \sqrt[4]{1/64}, \sqrt[4]{1/32}, \sqrt[4]{1/16}, \sqrt[4]{1/8}, \sqrt[4]{1/4}, \sqrt[4]{1/2}, 1\}$. When pick is quantized by using one bit, $p_{i,j,k}^{(2)} \in \{\sqrt{1/2}, 1\}$. $\varphi_{i,j,k} = \exp(j2\pi c_{i,j,k}/N_{PSK})$ is a phase of the combination coefficient corresponding to the $i^{th}$ polarization direction, the $j^{th}$ layer, and the $k^{th}$ beam. $\varphi_{i,j,k}$ may be quantized by using two bits or three bits, in other words, $N_{PSK}=4$ or $N_{PSK}=8$.

A precoding vector is quantized by using the foregoing uncompressed Type II codebook, and indication information of the precoding vector is reported to the network device, to help the network device obtain an optimal precoding vector. According to the method for reporting the precoding vector, although performance is improved, large precoding vector indication overheads are caused. For example, for the precoding vector, amplitudes and phases of combination coefficients corresponding to L spatial domain beam basis vectors corresponding to each PMI frequency domain unit need to be reported. Especially, more PMI frequency domain units indicate more combination coefficients needing to be reported. For example, if there are $N_3$ PMI frequency domain units, $L*N_3$ combination coefficients need to be reported, causing large report overheads.

To resolve this problem, spatial-frequency compression of the Type II codebook is implemented based on frequency domain channel relevancy and an idea of frequency domain compression. If a combination coefficient matrix of spatial domain beam basis vectors corresponding to an $i^{th}$ ($1 \leq i \leq N_3$) PMI frequency domain unit is denoted as $W_2^{(i)}$, combination coefficient matrices of spatial domain beam basis vectors corresponding to $N_3$ PMI frequency domain units may be combined into a joint combination coefficient matrix $\tilde{W}_2 = [W_2^{(1)} \ldots W_2^{(N_3)}]$ having a dimension of $L \times N_3$. K frequency domain basis vectors corresponding to each of the L/2 spatial domain beam basis vectors are selected from a frequency domain basis matrix $W_{freq}$ having a dimension of $N_3 \times N_3$ to form a frequency domain matrix $W_3$, and $\tilde{W}_2$ is transformed into $\tilde{W}_2 = \tilde{W} W_3$. The frequency domain basis matrix $W_{freq}$ may be a DFT matrix or a conjugate transpose matrix of a DFT matrix, or may be an oversampled DFT matrix or a conjugate transpose matrix of an oversampled DFT matrix. A joint precoding matrix W formed by precoding vectors may be further represented as:

$$W = W_1 \tilde{W} W_3$$

For example, when each of the L spatial domain beam basis vectors corresponds to same K frequency domain basis vectors, the frequency domain matrix $W_3$ has a dimension of $K \times N_3$, and includes the same K frequency domain basis vectors corresponding to each of the L spatial domain beam basis vectors. $\tilde{W}$ is a spatial-frequency combination coefficient matrix, and has a dimension of L×K. An $i^{th}$ row in the spatial-frequency combination coefficient matrix $\tilde{W}$ corresponds to an $i^{th}$ spatial domain beam basis vector in the L spatial domain beam basis vectors, and a $j^{th}$ column in the spatial-frequency combination coefficient matrix $\tilde{W}$ corresponds to a $j^{th}$ frequency domain basis vector in the K frequency domain basis vectors. A spatial-frequency combination coefficient vector corresponding to the $i^{th}$ spatial domain beam basis vector is an $i^{th}$ row vector in the spatial-frequency combination coefficient matrix $\tilde{W}$, and spatial-frequency combination coefficients corresponding to the $i^{th}$ spatial domain beam basis vector are elements included in the $i^{th}$ row vector in the spatial-frequency combination coefficient matrix $\tilde{W}$. In addition, each of the L spatial domain beam basis vectors may alternatively correspond to different frequency domain basis vectors.

In the uncompressed Type II codebook, the network device implements codebook subset restriction by using a higher layer parameter n1-n2-codebookSubsetRestriction. Type II codebook subset restriction is mainly specific to a spatial domain beam basis vector that can be selected in a predefined spatial domain beam matrix. Bits in the higher layer parameter n1-n2-codebook SubsetRestriction form a bit sequence $B=B_1B_2$, and a method for the codebook subset restriction may include the following two steps:

(1) The network device configures restrictions on Y of $O_1O_2$ spatial domain beam basis vector groups for the terminal device, and a $k^{th}$ spatial domain beam basis vector group in the Y spatial domain beam basis vector groups may be represented by a corresponding spatial domain beam rotation factor index $(r_1^{(k)}, r_2^{(k)})$, where $k=0, 1, \ldots,$ or $Y-1$, $r_1^{(k)} \in \{0, 1, \ldots, O_1-1\}$, and $r_2^{(k)} \in \{0, 1, \ldots, O_2-1\}$. The $k^{th}$ spatial domain beam basis vector group includes $N_1N_2$ orthogonal spatial domain beam basis vectors, and a set including these orthogonal spatial domain beam basis vectors may be represented as G $(r_1^{(k)}, r_2^{(k)}) = \{V_{N_1r_1^{(k)}+x_1, N_2r_2^{(k)}+x_2} : x_1=0, 1, \ldots, N_1-1; x_2=0, 1, \ldots, N_2-1\}$. To reduce indication overheads, Y is usually equal to 4, and indexes of the configured spatial domain beam basis vector groups are jointly encoded as $g^{(k)}=O_1r_2^{(k)}+r_1^{(k)}$. If $N_2=1$, $g^{(k)}=k$. If $N_2>1$, $g^{(k)}$ may be indicated as a combinatorial number by using a sequence $B_1=b_1^{(10)} \ldots b_1^{(0)}$.

(2) A largest value of a wideband amplitude in the $N_1N_2$ spatial domain beam basis vectors included in the $k^{th}$ spatial domain beam basis vector group is restricted by using a bit sequence $B_2^{(k)}=b_2^{(k,2N_1N_2-1)} \ldots b_2^{(k,0)}$. Bits $b_2^{(k,2(N_1x_2+x_1)+1)}$ $b_2^{(k,2(N_1x_2+x_1))}$ are used to indicate a maximum allowed wideband amplitude value of a spatial domain beam basis vector, corresponding to an index $(x_1, x_2)$, included in the $k^{th}$ spatial domain beam basis vector group $g^{(k)}$. A maximum allowed wideband amplitude value corresponding to each spatial domain beam basis vector is indicated by using two bits. Amplitude restriction indication sequences $B_2^{(k)}$ corresponding to Y restricted spatial domain beam basis vector groups form a bit sequence $B_2=B_2^0 \ldots B_2^{(Y-1)}$.

In the Type II codebook, a maximum allowed value of a wideband amplitude corresponding to a selected spatial domain beam is restricted. However, for a frequency domain compressed codebook, there is no concept of a wideband combination coefficient and a subband combination coefficient, but there is a concept of a two-dimensional spatial-frequency combination coefficient corresponding to both a spatial domain basis vector and a frequency domain basis vector. The wideband combination coefficient may be an average of all subband combination coefficients.

Figure 2:
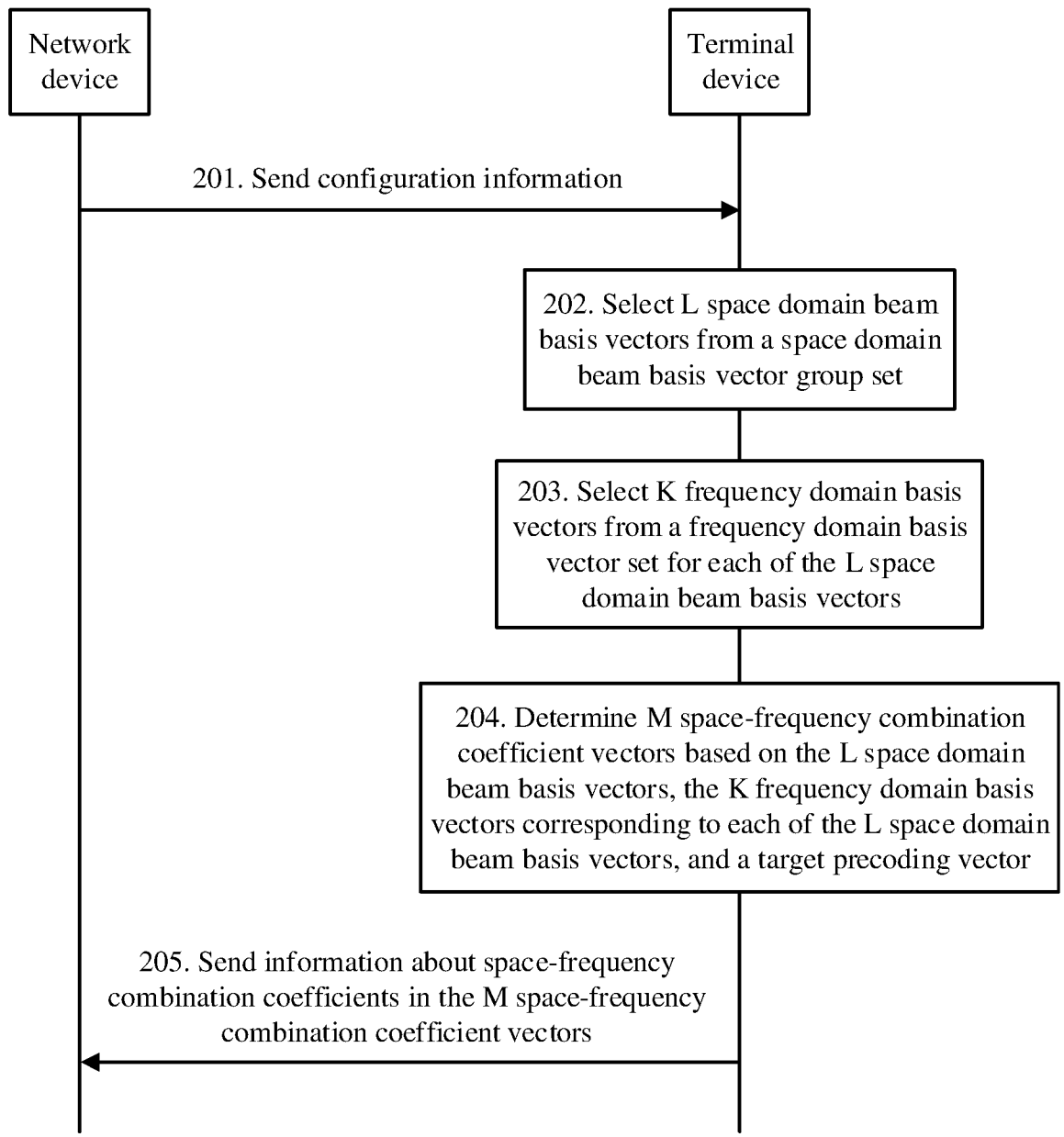
FIG. 2 is a schematic flowchart of a communication method according to an embodiment of the present invention.

Based on the network architecture shown in FIG. 1, FIG. 2 is a schematic flowchart of a communication method according to an embodiment of the present invention. As shown in FIG. 2, the communication method may include the following steps.

201. The network device sends configuration information to the terminal.

The network device includes $O_1O_2$ spatial domain beam basis vector groups, and each of the $O_1O_2$ spatial domain beam basis vector groups includes $N_1N_2$ spatial domain beam basis vectors. A value of $O_1$ may be 4, and a value of $O_2$ may be 1 or 4. A value combination of $(N_1, N_2)$ may be $(N_1, N_2) \in \{(2, 1), (2, 2), (4, 1), (3, 2), (6, 1), (4, 2), (8, 1), (4, 3), (6, 2), (12, 1), (4, 4), (8, 2), (16, 1)\}$. There may be a correspondence between a value of $(N_1, N_2)$ and a value of $(O_1, O_2)$. When $N_2=1$, $O_2=1$. The value of $(N_1, N_2)$, the value of $(O_1, O_2)$, and the correspondence between a value of $(N_1, N_2)$ and a value of $(O_1, O_2)$ may be predefined, or may be configured by the network device. In the $O_1O_2$ spatial domain beam basis vector groups, there is a spatial domain beam basis vector group including spatial domain beam basis vectors corresponding to beams pointing to one or more neighboring cells. If these beams are used, and energy or powers corresponding to these beams is/are relatively large, relatively strong interference is caused to the one or more neighboring cells. Therefore, when the network device needs to precode information sent by the terminal device, the network device may send the configuration information to the terminal device. The configuration information may indicate one or more spatial domain beam basis vector groups and Q thresholds. The one or more spatial domain beam basis vector groups are selected from the $O_1O_2$ spatial domain beam basis vector groups and need to be restricted; and may be selected based on a beam for communicating with a neighboring cell of the terminal device, or may be selected in another manner. This is not limited in this embodiment. The Q thresholds correspond one-to-one to spatial domain beam basis vectors in the one or more spatial domain beam basis vector groups, in other words, one beam uniquely corresponds to one threshold. Q is an integer greater than 1, and beams correspond one-to-one to the spatial domain beam basis vectors. For example, $Q=N_1N_2$*a quantity of groups. The quantity of groups is a quantity of spatial domain beam basis vector groups included in the one or more spatial domain beam basis vector groups. The spatial domain beam basis vectors in each of the $O_1O_2$ spatial domain beam basis vector groups may be orthogonal to each other, or may not be orthogonal to each other. The threshold may be 0, $\sqrt{1/4}$, $\sqrt{1/2}$, or 1.

The configuration information may explicitly indicate the foregoing information. For example, the configuration information may include the one or more spatial domain beam basis vector groups and the Q thresholds. Alternatively, the configuration information may implicitly indicate the foregoing information. For example, the configuration information may include codebook subset restriction information, the codebook subset restriction information may include indication information and restriction information, the indication information may include an index of the one or more spatial domain beam basis vector groups, and the restriction information may indicate the Q thresholds or may include indexes corresponding to the Q thresholds. For example, the configuration information may alternatively include first indication information and second indication information, the first indication information may include the index of the one or more spatial domain beam basis vector groups, and the second indication information may indicate the Q thresholds. When the configuration information includes the indexes corresponding to the Q thresholds, a correspondence between the indexes and the thresholds is predefined. When the configuration information includes the index of the one or more spatial domain beam basis vector groups, the index is related to a spatial domain beam rotation factor. For detailed descriptions, refer to the descriptions corresponding to the application scenario.

The configuration information may be sent to the terminal device by using one piece of higher layer signaling. The higher layer signaling may include a plurality of pieces of sub-signaling. One piece of sub-signaling may be used to send only one piece of information in the configuration information, or may be used to send a plurality of pieces of information in the configuration information. Alternatively, the configuration information may be sent to the terminal device by using a plurality of fields. One or more of the plurality of fields may be used to send only one piece of information in the configuration information, or may be used to send a plurality of pieces of information in the configuration information.

Optionally, when the network device requires the terminal device to report only a part of spatial-frequency combination coefficients, the configuration information may further indicate a quantity of spatial-frequency combination coefficients. The configuration information may explicitly indicate the quantity of spatial-frequency combination coefficients, that is, the configuration information may further include the quantity of spatial-frequency combination coefficients. Alternatively, the configuration information may implicitly indicate the quantity of spatial-frequency combination coefficients, that is, the configuration information may further include indication information used to indicate the quantity of spatial-frequency combination coefficients.

Optionally, the network device may have a plurality of spatial layers, and different quantities of spatial layers may correspond to different downlink precoding vectors. Therefore, when the network device has a plurality of spatial layers, the configuration information configured by the network device for different spatial layers may include same information or different information. When the configuration information configured by the network device for different spatial layers includes different information, the configuration information may include the foregoing information for the different spatial layers.

202. The terminal device selects L spatial domain beam basis vectors from a spatial domain beam basis vector group set.

After receiving the configuration information from the network device, the terminal device may select the L spatial domain beam basis vectors from the spatial domain beam basis vector group set. The spatial domain beam basis vector group set is a set of a plurality of spatial domain beam basis vector groups, to be specific, is a set of the $O_1O_2$ spatial domain beam basis vector groups of the network device. One group of spatial domain beam basis vectors may be first selected from the spatial domain beam basis vector group set, in other words, one spatial domain beam basis vector group is selected from the spatial domain beam basis vector group set. Then, the L spatial domain beam basis vectors are selected from the group of spatial domain beam basis vectors. The group of spatial domain beam basis vectors and the L spatial domain beam basis vectors may be randomly selected; or a group of spatial domain beam basis vectors having largest powers and L spatial domain beam basis vectors having largest powers may be selected; or a group of spatial domain beam basis vectors having smallest powers and L spatial domain beam basis vectors having smallest powers may be selected; or selection may be performed according to another rule. This is not limited in this embodiment.

Optionally, when there is one polarization direction, the L spatial domain beam basis vectors are L different spatial domain beam basis vectors selected from the spatial domain beam basis vector group set. When there are two polarization directions, L/2 spatial domain beam basis vectors are actually selected from the spatial domain beam basis vector group set, and the same L/2 spatial domain beam basis vectors are used in the two polarization directions. This may be considered as selecting each of the selected L/2 spatial domain beam basis vectors twice. Therefore, the L spatial domain beam basis vectors are obtained. When there are P polarization directions, L/P spatial domain beam basis vectors are actually selected from the spatial domain beam basis vector group set, but each of the selected L/P spatial domain beam basis vectors is selected for P times. Therefore, the L spatial domain beam basis vectors are obtained. P is a quantity of polarization directions. L/P may be 2, 3, 4, or 6.

L may be determined by the terminal device, may be configured by the network device, or may be pre-agreed on. When L is configured by the network device, the configuration information is further used to implicitly or explicitly indicate the quantity L/P of spatial domain beam basis vectors.

Optionally, when the network device has a plurality of spatial layers, different spatial layers may correspond to same L spatial domain beam basis vectors or different L spatial domain beam basis vectors.

203. The terminal device selects K frequency domain basis vectors from a frequency domain basis vector set for each of the L spatial domain beam basis vectors.

After selecting the L spatial domain beam basis vectors from the spatial domain beam basis vector group set, the terminal device may select the K frequency domain basis vectors from the frequency domain basis vector set for each of the L spatial domain beam basis vectors. The K frequency domain basis vectors corresponding to each of the L spatial domain beam basis vectors may be completely the same, or may be partially the same, or may be completely different. The K frequency domain basis vectors for each of the L spatial domain beam basis vectors may be randomly selected; or K frequency domain basis vectors having largest powers may be selected; or K frequency domain basis vectors having smallest powers may be selected; or selection may be performed according to another rule. This is not limited in this embodiment. K may be 1, 2, 3, 4, 5, or 6.

The frequency domain basis vector set may include a plurality of groups of frequency domain basis vectors, and frequency domain basis vectors in each of the plurality of groups of frequency domain basis vectors are orthogonal to each other. When the K frequency domain basis vectors are selected from the frequency domain basis vector set for each of the L spatial domain beam basis vectors, one group of frequency domain basis vectors may be first selected from the plurality of groups of frequency domain basis vectors, and then the K frequency domain basis vectors are selected from the group of frequency domain basis vectors. A specific selection manner may be the same as that described above.

K may be determined by the terminal device, may be configured by the network device, or may be pre-agreed on. When K is configured by the network device, the configuration information is further used to implicitly or explicitly indicate the quantity K of frequency domain basis vectors.

Optionally, when the network device has a plurality of spatial layers, each spatial layer may correspond to same frequency domain basis vectors or different frequency domain basis vectors.

204. The terminal device determines M spatial-frequency combination coefficient vectors based on the L spatial domain beam basis vectors, the K frequency domain basis vectors corresponding to each of the L spatial domain beam basis vectors, and a target precoding vector.

A matrix including the target precoding vector is a high-resolution compressed codebook $W=W_1 \times \tilde{W} \times W_3$. $W_1$ may be referred to as a spatial domain beam matrix, that is, a matrix including the L spatial domain beam basis vectors. $\tilde{W}$ may be referred to as a spatial-frequency combination coefficient matrix, that is, a matrix including L spatial-frequency combination coefficient vectors. $W_3$ may be referred to as a frequency domain matrix, that is, a matrix including the K frequency domain basis vectors corresponding to each of the L spatial domain beam basis vectors. When the same K frequency domain basis vectors are used for the L spatial domain beam basis vectors, $W_3$ may be a matrix including the K frequency domain basis vectors. W is determined by the terminal device based on an estimated downlink channel, $W_1$ may be determined based on the L spatial domain beam basis vectors, and $W_3$ may be determined based on the K frequency domain basis vectors corresponding to each of the L spatial domain beam basis vectors. Therefore, W may be determined based on W, $W_1$, and $W_3$. $\tilde{W}$ herein is a matrix including all the spatial-frequency combination coefficient vectors. One column in $W_1$ represents one spatial domain beam basis vector, one row in $\tilde{W}$ represents one spatial-frequency combination coefficient vector, and an $i^{th}$ column of spatial domain beam basis vector in $W_1$ corresponds to an $i^{th}$ row of spatial-frequency combination coefficient vector in $\tilde{W}$. A spatial-frequency combination coefficient vector corresponding to a spatial domain beam basis vector is a spatial-frequency combination coefficient vector determined based on the spatial domain beam basis vector and frequency domain basis vectors corresponding to the spatial domain beam basis vector. A spatial-frequency combination coefficient vector is a vector including a plurality of spatial-frequency combination coefficients, and spatial-frequency combination coefficients included in or corresponding to a spatial-frequency combination coefficient vector are all spatial-frequency combination coefficients in the spatial-frequency combination coefficient vector.

Therefore, after selecting the K frequency domain basis vectors from the frequency domain basis vector set for each of the L spatial domain beam basis vectors, the terminal device may determine the M spatial-frequency combination coefficient vectors based on the L spatial domain beam basis vectors, the K frequency domain basis vectors corresponding to each of the L spatial domain beam basis vectors, and the target precoding vector. One spatial-frequency combination coefficient vector corresponds to one spatial domain beam basis vector. This may be embodied as a correspondence or a correspondence table, and the correspondence or the correspondence table may be predefined. Herein, the one spatial-frequency combination coefficient vector means that there is one or at least one spatial-frequency combination coefficient vector. For example, there are L combination coefficient vectors, and the L combination coefficient vectors may correspond one-to-one to the L spatial domain beam basis vectors (where a plurality of spatial-frequency combination coefficient vectors may correspond to one/a same spatial domain beam basis vector). If only a part of the spatial-frequency combination coefficient vectors are reported, the part of the spatial-frequency combination coefficient vectors are the M spatial-frequency combination coefficient vectors. Each of the L spatial-frequency combination coefficient vectors corresponds to one spatial domain beam basis vector, or each of the M spatial-frequency combination coefficient vectors corresponds to one spatial domain beam basis vector. A spatial-frequency combination coefficient vector corresponding to one spatial domain beam basis vector satisfies a restriction rule, and the restriction rule is associated with a threshold corresponding to the spatial domain beam basis vector. Specifically, when the one or more spatial domain beam basis vector groups include the L spatial domain beam basis vectors, because each of the L spatial domain beam basis vectors has a corresponding threshold, the selected spatial domain beam basis vectors need to be restricted, and a spatial-frequency combination coefficient vector corresponding to one spatial domain beam basis vector needs to satisfy a restriction rule. When the one or more spatial domain beam basis vector groups do not include the L spatial domain beam basis vectors, because each of the L spatial domain beam basis vectors does not have a corresponding threshold, selected beams do not need to be restricted, and a spatial-frequency combination coefficient vector corresponding to one spatial domain beam basis vector does not need to satisfy a predefined restriction rule. Different spatial domain beam basis vectors may have different restriction rules, or may have a same restriction rule.

The restriction rule may be that a value of a power function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups. Alternatively, the restriction rule may be that a value of a power function of spatial-frequency combination coefficients corresponding to a first spatial domain beam basis vector needs to be less than or equal to a square of a threshold corresponding to the first spatial domain beam basis vector. Alternatively, the restriction rule may be that a value of a power function of spatial-frequency combination coefficients corresponding to a first spatial domain beam basis vector needs to be less than or equal to a linear combination of a fixed value and a square of a threshold corresponding to the first spatial domain beam basis vector. The linear combination may be multiplication or division, or may be addition or subtraction, or may be multiplication, division, addition, or subtraction. There may be one or more fixed values. Alternatively, the restriction rule may be that a value of a power function of spatial-frequency combination coefficients corresponding to a first spatial domain beam basis vector needs to be less than or equal to another value of a threshold corresponding to the first spatial domain beam basis vector, for example, a square root of the threshold, a cube root of the threshold, a fourth root of the threshold, a cube of the threshold, a fourth power of the threshold, a product of the threshold and a fixed value, or a linear combination of a square root of the threshold and a fixed value. The first spatial domain beam basis vector herein may be merely used for general description of a spatial domain beam basis vector that needs to satisfy a restriction rule. When the one or more spatial domain beam basis vector groups include the L spatial domain beam basis vectors, the first spatial domain beam basis vector is any one of the L spatial domain beam basis vectors. The power function may be a ratio of a first power to a second power, the first power is a power sum of the spatial-frequency combination coefficients corresponding to the first spatial domain beam basis vector, and the second power is a largest value of power sums of spatial-frequency combination coefficients corresponding to each of M spatial domain beam basis vectors. The M spatial domain beam basis vectors are spatial domain beam basis vectors corresponding to the M spatial-frequency combination coefficient vectors. The first spatial domain beam basis vector is any one of the M spatial domain beam basis vectors. When the one or more spatial domain beam basis vector groups include the L spatial domain beam basis vectors, the L spatial domain beam basis vectors include the M spatial domain beam basis vectors, that is, the M spatial domain beam basis vectors may be all or a part of the L spatial domain beam basis vectors. When all the spatial-frequency combination coefficients are reported, the M spatial domain beam basis vectors are the L spatial domain beam basis vectors. When only a part of the spatial-frequency combination coefficients are reported, the M spatial domain beam basis vectors may be a part of the L spatial domain beam basis vectors, or may be all the L spatial domain beam basis vectors. For example, a power function $\alpha_1$ may be represented as follows:

$$\alpha_1 = \frac{\sum_{j=1}^{Xs}|\tilde{W}^{(s,j)}|^2}{\max_{i\in[1,M]}\left(\sum_{j=1}^{Xi}|\tilde{W}^{(i,j)}|^2\right)}$$

$\alpha_1$ is the power function, $|\tilde{W}^{(s,j)}|$ is an amplitude of a $j^{th}$ spatial-frequency combination coefficient in an $s^{th}$ spatial-frequency combination coefficient vector, Xs is a quantity of spatial-frequency combination coefficients in the $s^{th}$ spatial-frequency combination coefficient vector, and Xi is a quantity of spatial-frequency combination coefficients in an $i^{th}$ spatial-frequency combination coefficient vector, where s is greater than or equal to 1 and less than or equal to M. $|\tilde{W}^{(i,j)}|$ is an amplitude of a $j^{th}$ spatial-frequency combination coefficient in the $i^{th}$ spatial-frequency combination coefficient vector. The spatial-frequency combination coefficient is a complex number that includes a real part and an imaginary part. An amplitude of a spatial-frequency combination coefficient is a square root of a sum of a square of a real part and a square of an imaginary part of the spatial-frequency combination coefficient. A power of the spatial-frequency combination coefficient is a square of the amplitude of the spatial-frequency combination coefficient. The restriction rule may be $\alpha_1 \leq Z$, and Z is a threshold corresponding to an $s^{th}$ spatial domain beam basis vector. Alternatively, the restriction rule may be $\alpha_1 \leq Z^2$, or may be that $\alpha_1$ is less than or equal to another value related to Z. For specific descriptions, refer to the foregoing related descriptions, and details are not described herein again. Alternatively, the power function may be a power sum of the spatial-frequency combination coefficients corresponding to the first spatial domain beam basis vector. For example, a power function $\alpha_2$ may be represented as follows:

$$\alpha_2 = \sum_{j=1}^{Xs}|\tilde{W}^{(s,j)}|^2$$

The restriction rule may be $\alpha_2 \leq Z$. Alternatively, the restriction rule may be $\alpha_2 \leq Z^2$, or may be that $\alpha_2$ is less than or equal to another value related to Z. For specific descriptions, refer to the foregoing related descriptions, and details are not described herein again. In an implementation, the restriction rule may alternatively be that $\alpha_2$ is less than or equal to a linear combination of $Z^2$ and a fixed value, for example, $\alpha_1 \leq \delta \cdot Z^2$. $\delta$ is a determined fixed value, for example, $\delta = Xs$. An amplitude of a first spatial-frequency combination coefficient may be a product of a reference amplitude and a differential amplitude. The reference amplitude may be a largest value of quantized amplitudes of spatial-frequency combination coefficients, in a first polarization direction, corresponding to the first spatial domain beam basis vector. The differential amplitude may be a ratio of a quantized amplitude of the first spatial-frequency combination coefficient to the reference amplitude. The first spatial-frequency combination coefficient is any one of the spatial-frequency combination coefficients, in the first polarization direction, corresponding to the first spatial domain beam basis vector. The first polarization direction is any one of polarization directions of the first spatial domain beam basis vector.

Alternatively, the restriction rule may be that a value of an amplitude function of spatial-frequency combination coefficients corresponding to a first spatial domain beam basis vector needs to be less than or equal to a threshold corresponding to the first spatial domain beam basis vector. Alternatively, the restriction rule may be that a value of an amplitude function of spatial-frequency combination coefficients corresponding to a first spatial domain beam basis vector needs to be less than or equal to another value related to a threshold corresponding to the first spatial domain beam basis vector. For specific descriptions, refer to the foregoing related descriptions, and details are not described herein again. The amplitude function may be a largest value of amplitudes of the spatial-frequency combination coefficients corresponding to the first spatial domain beam basis vector. For example, an amplitude function $\alpha_3$ may be represented as follows:

$$\alpha_3 = \max|\tilde{W}^{(s,j)}|, j = 1, 2, \ldots, Xs$$

The restriction rule may be $\alpha_3 \leq Z$. Alternatively, the restriction rule may be $\alpha_3 \leq Z^2$, or may be that $\alpha_3$ is less than or equal to another value related to Z. For specific descriptions, refer to the foregoing related descriptions, and details are not described herein again. Alternatively, the amplitude function may be an average value of amplitudes of the spatial-frequency combination coefficients corresponding to the first spatial domain beam basis vector. For example, an amplitude function $\alpha_4$ may be represented as follows:

$$\alpha_4 = \frac{\sum_{j=1}^{X_s} |\tilde{W}^{(s,j)}|}{X_s}$$

The restriction rule may be $\alpha_4 \leq Z$. Alternatively, the restriction rule may be $\alpha_4 \leq Z^2$, or may be that $\alpha_4$ is less than or equal to another value related to Z. For specific descriptions, refer to the foregoing related descriptions, and details are not described herein again. Alternatively, the amplitude function may be a sum of amplitudes of the spatial-frequency combination coefficients corresponding to the first spatial domain beam basis vector. For example, an amplitude function as may be represented as follows:

$$\alpha_5 = \sum_{j=1}^{X_s} |\tilde{W}^{(s,j)}|$$

The restriction rule may be $\alpha_5 \leq Z$. Alternatively, the restriction rule may be $\alpha_5 \leq Z^2$, or may be that as is less than or equal to another value related to Z. For specific descriptions, refer to the foregoing related descriptions, and details are not described herein again. Alternatively, the amplitude function may be a largest value of quantized amplitudes of spatial-frequency combination coefficients, in a first polarization direction, corresponding to the first spatial domain beam basis vector, and the first polarization direction is any one of polarization directions of the first spatial domain beam basis vector.

Amplitudes of spatial-frequency combination coefficients in the M spatial-frequency combination coefficient vectors may be directly obtained through calculation based on the L spatial domain beam basis vectors, the K frequency domain basis vectors corresponding to each of the L spatial domain beam basis vectors, and the target precoding vector; or may be obtained by processing spatial-frequency combination coefficients obtained through calculation based on the L spatial domain beam basis vectors, the K frequency domain basis vectors corresponding to each of the L spatial domain beam basis vectors, and the target precoding vector. The processing herein may be normalization, may be quantization, or may be processing the same as that performed on the amplitude of the first spatial-frequency combination coefficient.

The determined M spatial-frequency combination coefficient vectors are all the spatial-frequency combination coefficients that need to be reported by the terminal device. When the terminal device needs to report all the spatial-frequency combination coefficients, a quantity of spatial-frequency combination coefficients included in $\tilde{W}$ is equal to a quantity of spatial-frequency combination coefficients included in the M spatial-frequency combination coefficient vectors. In this case, M=L. When the terminal device needs to report only a part of the spatial-frequency combination coefficients, a quantity of spatial-frequency combination coefficients included in $\tilde{W}$ is greater than a quantity of spatial-frequency combination coefficients included in the M spatial-frequency combination coefficient vectors. In this case, MEL, and a quantity of spatial-frequency combination coefficients included in each of the M spatial-frequency combination coefficient vectors is less than or equal to a quantity of spatial-frequency combination coefficients included in a corresponding spatial-frequency combination coefficient vector in the L spatial-frequency combination coefficient vectors included in $\tilde{W}$.

When the terminal device needs to report all the spatial-frequency combination coefficients, M=L, and M initial spatial-frequency combination coefficient vectors may be determined based on the L spatial domain beam basis vectors, the K frequency domain basis vectors corresponding to each of the L spatial domain beam basis vectors, and the target precoding vector. Then, when the one or more spatial domain beam basis vector groups do not include the group of spatial domain beam basis vectors, the M initial spatial-frequency combination coefficient vectors are determined as the M spatial-frequency combination coefficient vectors; or when the one or more spatial domain beam basis vector groups include the group of spatial domain beam basis vectors, and spatial-frequency combination coefficients in the M initial spatial-frequency combination coefficient vectors all satisfy corresponding restriction rules, the M initial spatial-frequency combination coefficient vectors may be determined as the M spatial-frequency combination coefficient vectors; or when the one or more spatial domain beam basis vector groups include the group of spatial domain beam basis vectors, and there is a spatial-frequency combination coefficient, in the M spatial-frequency combination coefficient vectors, not satisfying a corresponding restriction rule, an amplitude of the spatial-frequency combination coefficient not satisfying the restriction rule may be adjusted, to obtain the M spatial-frequency combination coefficient vectors, or step 202 to step 204 may be performed again until the M spatial-frequency combination coefficient vectors are determined. Specifically, after the M initial spatial-frequency combination coefficient vectors are determined, or the L spatial domain beam basis vectors are selected from the spatial domain beam basis vector group set, whether the one or more spatial domain beam basis vector groups include the L spatial domain beam basis vectors may be first determined. When it is determined that the one or more spatial domain beam basis vector groups do not include the L spatial domain beam basis vectors, it indicates that determined spatial-frequency combination coefficients do not need to be restricted. After M initial spatial-frequency combination coefficients are determined, the M initial spatial-frequency combination coefficient vectors may be determined as the M spatial-frequency combination coefficient vectors, that is, spatial-frequency combination coefficient vectors that need to be reported. When it is determined that the one or more spatial domain beam basis vector groups include the L spatial domain beam basis vector, and after M initial spatial-frequency combination coefficients are determined, whether spatial-frequency combination coefficients in the M initial spatial-frequency combination coefficient vectors all satisfy corresponding restriction rules may continue to be determined. When it is determined that the spatial-frequency combination coefficients in the M initial spatial-frequency combination coefficient vectors all satisfy the corresponding restriction rules, it indicates that the determined spatial-frequency combination coefficients already satisfy the corresponding restriction rules. Therefore, the M initial spatial-frequency combination coefficient vectors may be determined as the M spatial-frequency combination coefficient vectors, that is, spatial-frequency combination coefficient vectors that need to be reported. When it is determined that there is a spatial-frequency combination coefficient, in the M initial spatial-frequency combination coefficient vectors, not satisfying a corresponding restriction rule, it indicates that there is a spatial-frequency combination coefficient, in determined spatial-frequency combination coefficients, not satisfying a corresponding restriction rule, and an amplitude of the spatial-frequency combination coefficient not satisfying the restriction rule may be adjusted, so that the adjusted spatial-frequency combination coefficient satisfies the corresponding restriction rule, to obtain the M spatial-frequency combination coefficient vectors. When the amplitude of the spatial-frequency combination coefficient not satisfying the restriction rule is adjusted, the amplitude of only the spatial-frequency combination coefficient not satisfying the restriction rule may be adjusted, or amplitudes of all spatial-frequency combination coefficients corresponding to a spatial-frequency combination coefficient vector corresponding to the spatial-frequency combination coefficient not satisfying the restriction rule may be adjusted. When it is determined that there is a spatial-frequency combination coefficient, in the M initial spatial-frequency combination coefficient vectors, not satisfying a corresponding restriction rule, step 202 to step 204 may be performed again until the M spatial-frequency combination coefficient vectors are determined. That a spatial-frequency combination coefficient satisfies a corresponding restriction rule means that the spatial-frequency combination coefficient satisfies a restriction rule corresponding to a corresponding spatial domain beam basis vector. Different restriction rules may correspond to different adjustment rules.

For example, assuming that $N_1=2$ and $N_2=2$, the configuration information of the network device indicates that four of the $O_1O_2$ beam vector groups need to satisfy corresponding restriction rules. It is assumed that the restriction rule is that the largest value of the amplitude function of the spatial-frequency combination coefficients corresponding to the first spatial domain beam basis vector needs to be less than or equal to the threshold corresponding to the first spatial domain beam basis vector. For $N_1N_2$-4 orthogonal spatial domain beam basis vectors included in a $k^{th}$ spatial domain beam basis vector group $g^{(k)}$ in the four restricted spatial domain beam basis vector groups, the network device indicates, by using a bit sequence $B_2^{(k)}=b_2^{(k,7)}, b_2^{(k,6)} \ldots b_2^{(k,0)}=00011011$, thresholds corresponding to the $N_1N_{2=4}$ orthogonal spatial domain beam basis vectors. Therefore, when there are two polarization directions, a largest value of amplitudes of $K=8$ spatial-frequency combination coefficients corresponding to the $N_1N_2=4$ orthogonal spatial domain beam basis vectors is restricted. Indexes of the $N_1N_2=4$ orthogonal spatial domain beam basis vectors are jointly encoded, by using $(x_1, x_2)$, as $V=N_1x_2+x_1$. $x_1=0, 1, \ldots,$ or $N_1-1$, and $x_2=0, 1, \ldots,$ or $N_2-1$. A restriction threshold corresponding to a spatial domain beam basis vector whose index is V is indicated according to a predetermined rule by using two bits. An indication manner may be shown in Table 1.

TABLE 1

| $b_2^{(k,2(N_1x_2+x_1)+1)}b_2^{(k,2(N_1x_2+x_1))}$ | Threshold |
|---|---|
| 00 | 0 |
| 01 | $\sqrt{1/4}$ |
| 10 | $\sqrt{1/2}$ |
| 11 | 1 |

An indication manner may alternatively be shown in Table 2.

TABLE 2

| $b_2^{(k,2(N_1x_2+x_1)+1)}b_2^{(k,2(N_1x_2+x_1))}$ | Threshold |
|---|---|
| 00 | 0 |
| 01 | 1/4 |
| 10 | 1/2 |
| 11 | 1 |

Figure 3:
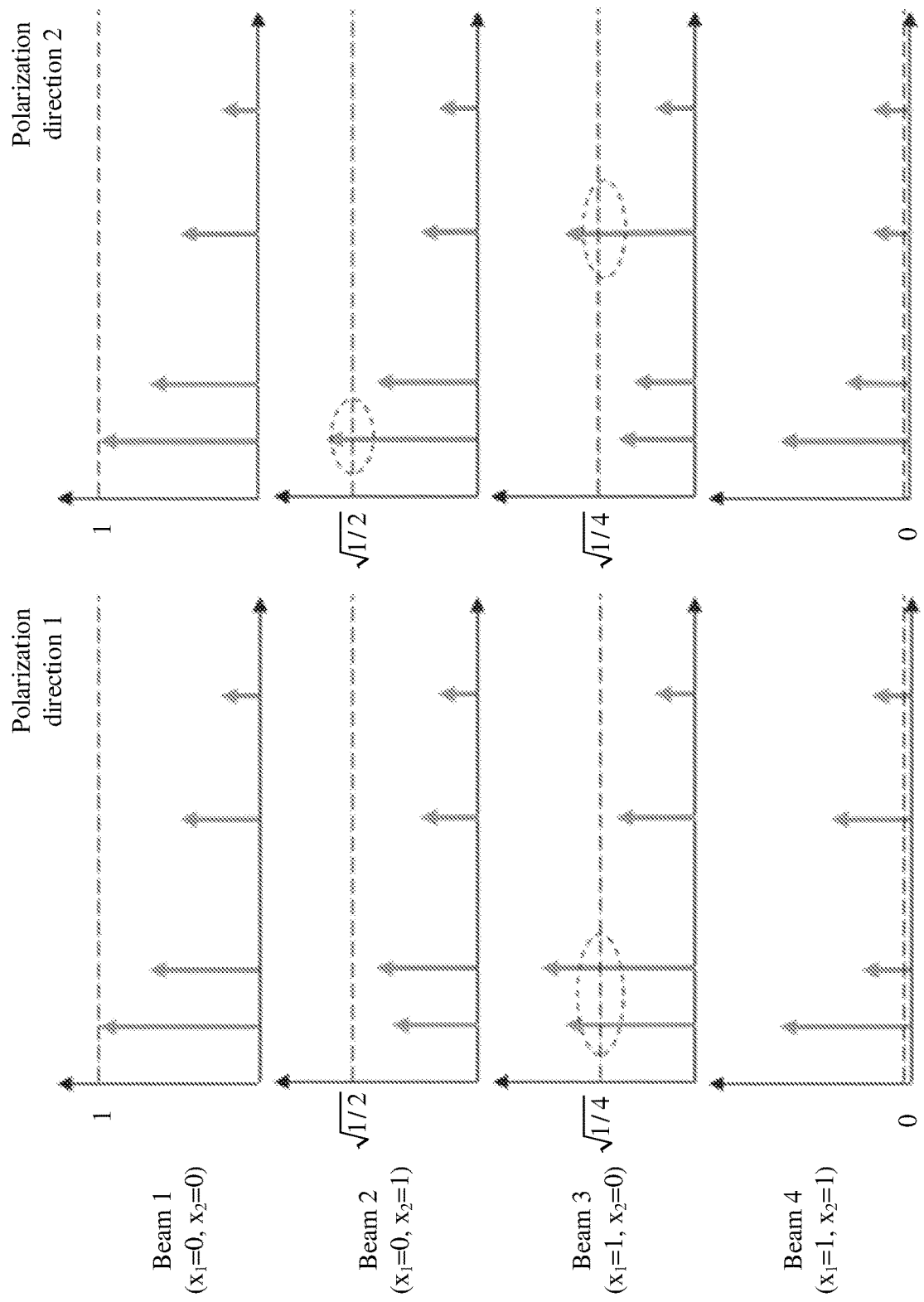
FIG. 3 is a schematic diagram of an amplitude of a spatial-frequency combination coefficient according to an embodiment of the present invention.

FIG. 3 is a schematic diagram of an amplitude of a spatial-frequency combination coefficient according to an embodiment of the present invention. As shown in FIG. 3, a threshold corresponding to a beam 1 (where an index is $(x_1=0, x_2=0)$) is 1. For a polarization direction 1 and a polarization direction 2, because amplitudes of four spatial-frequency combination coefficients corresponding to the beam 1 are all less than or equal to 1, the spatial-frequency combination coefficients corresponding to the beam 1 satisfy a corresponding restriction rule. A threshold corresponding to a beam 2 (where an index is $(x_1=0, x_2=1)$) is $\sqrt{1/2}$. For a polarization direction 1, because amplitudes of four spatial-frequency combination coefficients corresponding to the beam 2 are all less than or equal to $\sqrt{1/2}$, the spatial-frequency combination coefficients corresponding to the beam 2 satisfy a corresponding restriction rule. For a polarization direction 2, because there is one combination coefficient, in four spatial-frequency combination coefficients corresponding to the beam 2, whose amplitude is greater than $\sqrt{1/2}$, the spatial-frequency combination coefficients corresponding to the beam 2 do not satisfy a corresponding restriction rule. A threshold corresponding to a beam 3 (where an index is $(x_1=1, x_2=0)$) is $\sqrt{1/4}$. For a polarization direction 1 and a polarization direction 2, there is a spatial-frequency combination coefficient, in four spatial-frequency combination coefficients corresponding to the beam 3, whose amplitude is greater than $\sqrt{1/4}$, in other words, there is a spatial-frequency combination coefficient, in the spatial-frequency combination coefficients corresponding to the beam 3, not satisfying a corresponding restriction rule. If the beam 3 needs to be used, an amplitude of a spatial-frequency combination coefficient needs to be adjusted. Only the spatial-frequency combination coefficient, in the four spatial-frequency combination coefficients, not satisfying the restriction rule may be adjusted to a restriction threshold; or all the four spatial-frequency combination coefficients may be divided by a largest amplitude of the four spatial-frequency combination coefficients; or only the spatial-frequency combination coefficient, in the four spatial-frequency combination coefficients, not satisfying the restriction rule may be divided by a largest amplitude of the four spatial-frequency combination coefficients; or another adjustment manner may be used. This is not limited in this embodiment. For the polarization direction 2, if the beam 2 needs to be used, an amplitude of a spatial-frequency combination coefficient needs to be adjusted, and an adjustment manner may be the same as the foregoing manner. Different restriction rules may correspond to different adjustment policies. If the beam 3 is not used, a beam may be reselected, and the beam 3 may not be selected during beam reselection. A threshold corresponding to a beam 4 (where an index is $(x_1=1, x_2=1)$) is 0. This indicates that the beam 4 is unavailable. A beam is reselected, and the beam 4 may not be selected during beam reselection.

When the terminal device needs to report only a part of the spatial-frequency combination coefficients, M≤L, L initial spatial-frequency combination coefficient vectors may be determined based on the L spatial domain beam basis vectors, the K frequency domain basis vectors corresponding to each of the L spatial domain beam basis vectors, and the target precoding vector, and a part of spatial-frequency combination coefficients are selected from the L initial spatial-frequency combination coefficient vectors to obtain M initial spatial-frequency combination coefficient vectors. A quantity of spatial-frequency combination coefficients included in each of the M initial spatial-frequency combination coefficient vectors is less than or equal to a quantity of spatial-frequency combination coefficients included in a corresponding initial spatial-frequency combination coefficient vector in the L initial spatial-frequency combination coefficient vectors. A subsequent processing process is the same as a processing process performed when the terminal device needs to report all the spatial-frequency combination coefficients. For detailed descriptions, refer to the corresponding descriptions. Details are not described herein again. When the configuration information indicates a quantity of spatial-frequency combination coefficients, a quantity of spatial-frequency combination coefficients included in the M initial spatial-frequency combination coefficient vectors is equal to the quantity of spatial-frequency combination coefficients. When the configuration information does not indicate a quantity of spatial-frequency combination coefficients, a quantity of spatial-frequency combination coefficients included in the M initial spatial-frequency combination coefficient vectors is determined by the terminal device.

205. The terminal device sends information about the spatial-frequency combination coefficients in the M spatial-frequency combination coefficient vectors to the network device.

After determining the M spatial-frequency combination coefficient vectors based on the L spatial domain beam basis vectors, the K frequency domain basis vectors corresponding to each of the L spatial domain beam basis vectors, and the target precoding vector, the terminal device may send the information about the spatial-frequency combination coefficients in the M spatial-frequency combination coefficient vectors to the network device. The information about the spatial-frequency combination coefficients may include amplitudes and phases of the spatial-frequency combination coefficients. The terminal device may further send, to the network device, basis vector indexes of the L spatial domain beam basis vectors and basis vector indexes of the K frequency domain basis vectors corresponding to each of the L spatial domain beam basis vectors. When the K frequency domain basis vectors corresponding to each of the L spatial domain beam basis vectors are not completely the same, the terminal device may further send, to the network device, a correspondence between each of the L spatial domain beam basis vectors and the corresponding K frequency domain basis vectors. The information about the spatial-frequency combination coefficients may further include indexes of the spatial-frequency combination coefficients, and an index of a spatial-frequency combination coefficient is used to indicate a sequence number of the spatial-frequency combination coefficient and a sequence number of a spatial-frequency combination coefficient vector to which the spatial-frequency combination coefficient belongs. When the terminal device reports only a part of the spatial-frequency combination coefficients, and a quantity of spatial-frequency combination coefficients included in the part of the spatial-frequency combination coefficients is determined by the terminal device, a quantity of spatial-frequency combination coefficients included in the M spatial-frequency combination coefficient vectors may further be sent to the network device. The amplitude and the phase of the spatial-frequency combination coefficient may be a quantized value, or may be a non-quantized value. In an amplitude quantization process, an amplitude of each spatial-frequency combination coefficient included in the M spatial-frequency combination coefficient vectors may be normalized with reference to a largest amplitude of all the spatial-frequency combination coefficients included in the M spatial-frequency combination coefficient vectors, in other words, a normalized amplitude of each spatial-frequency combination coefficient included in the spatial-frequency combination coefficient vectors is a result obtained by dividing the amplitude of the spatial-frequency combination coefficient by the largest amplitude of all the spatial-frequency combination coefficients included in the M spatial-frequency combination coefficient vectors. A phase of each spatial-frequency combination coefficient included in the M spatial-frequency combination coefficient vectors may be normalized with reference to a phase of a spatial-frequency combination coefficient with the largest amplitude in all the spatial-frequency combination coefficients included in the M spatial-frequency combination coefficient vectors, in other words, a normalized phase of each spatial-frequency combination coefficient included in the spatial-frequency combination coefficient vectors is a result obtained by subtracting, from the phase of the spatial-frequency combination coefficient, the phase of the spatial-frequency combination coefficient with the largest amplitude in all the spatial-frequency combination coefficients included in the M spatial-frequency combination coefficient vectors. When the amplitudes and the phases of the spatial-frequency combination coefficients are quantized values, the terminal device may report the amplitudes and the phases of the spatial-frequency combination coefficients to the network device by using indexes. A correspondence between an index and an amplitude or a phase may be predefined. It is assumed that values of quantized amplitudes are 0, $\sqrt{1/64}$, $\sqrt{1/32}$, $\sqrt{1/16}$, $\sqrt{1/8}$, $\sqrt{1/4}$, $\sqrt{1/2}$, and 1, and each of the eight values may uniquely correspond to one index. When $\sqrt{1/2}$ is closest to a normalized value of an amplitude of a spatial-frequency combination coefficient, it is determined that a quantized value of the amplitude of the spatial-frequency combination coefficient is $\sqrt{1/2}$. When the amplitude of the spatial-frequency combination coefficient is reported to the network device, an index corresponding to $\sqrt{1/2}$ may be reported. Quantization and reporting of a phase of a spatial-frequency combination coefficient are similar to those of the amplitude, and details are not described herein again.

After receiving, from the terminal device, the information about the spatial-frequency combination coefficients in the M spatial-frequency combination coefficient vectors, the basis vector indexes of the L spatial domain beam basis vectors, and the basis vector indexes of the K frequency domain basis vectors corresponding to each of the L spatial domain beam basis vectors, the network device may determine $W_1$ based on the basis vector indexes of the L spatial domain beam basis vectors, may determine $W_3$ based on the basis vector indexes of the K frequency domain basis vectors corresponding to each of the L spatial domain beam basis vectors, and may determine W based on the information about the spatial-frequency combination coefficients in the M spatial-frequency combination coefficient vectors. When the terminal device reports only a part of the spatial-frequency combination coefficients, zero may be added to a location, in $\tilde{W}$, of a spatial-frequency combination coefficient that is not reported, and then the target precoding vector is determined based on $W_1$, $\tilde{W}$, and $W_3$.

When an amplitude and a phase of a spatial-frequency combination coefficient reported by the terminal device to the network device are quantized values, the amplitude and the phase may be quantized separately. For the amplitude, a quantization manner is as follows: For T to-be-reported spatial-frequency combination coefficients, amplitudes of the T spatial-frequency combination coefficients may be separately divided by a largest value of the amplitudes of the T spatial-frequency combination coefficients, to obtain T normalized spatial-frequency combination coefficients, and then quantized values closest to the T normalized spatial-frequency combination coefficients are separately selected from available quantized values, to obtain quantized amplitudes of the T spatial-frequency combination coefficients. A quantized amplitude of a spatial-frequency combination coefficient with the largest amplitude is 1. For example, if a non-quantized amplitude of an $i^{th}$ spatial-frequency combination coefficient in the T spatial-frequency combination coefficients is a, an amplitude, normalized but non-quantized, of the spatial-frequency combination coefficient is a/c. c is the largest value of the amplitudes of the T spatial-frequency combination coefficients.

A reference amplitude in a polarization direction in which a spatial-frequency combination coefficient with a largest amplitude is located is 1, and a reference amplitude in another polarization direction is a quantized amplitude of a combination coefficient with a largest amplitude in the corresponding polarization direction. The reference amplitude may be quantized and reported by using four bits, and available quantized values are 1, $(\frac{1}{2})^{1/4}$, $(\frac{1}{4})^{1/4}$, $(\frac{1}{8})^{1/4}$, $(\frac{1}{16})^{1/4}$, ..., $(\frac{1}{2^{14}})^{1/4}$, and 0. For each polarization direction, a differential amplitude of a spatial-frequency combination coefficient in the polarization direction is obtained by dividing a quantized amplitude of the spatial-frequency combination coefficient in the polarization direction by a reference amplitude in the polarization direction. A differential amplitude of each spatial-frequency combination coefficient may be quantized and reported by using three bits, and available quantized values are 1, $1/\sqrt{2}$, $\frac{1}{2}$, $\frac{1}{2}\sqrt{2}$, $\frac{1}{4}$, $\frac{1}{4}\sqrt{2}$, $\frac{1}{8}$, and $\frac{1}{8}\sqrt{2}$. A quantized amplitude value of each spatial-frequency combination coefficient may be represented as a product of a corresponding reference amplitude value in a polarization direction in which the spatial-frequency combination coefficient is located and a differential amplitude value corresponding to the spatial-frequency combination coefficient. A phase of each spatial-frequency combination coefficient may be quantized by using three bits (for example, through 8 phase shift keying (phase shift keying, PSK)) or four bits (for example, through 16 PSK).

For example, assuming that $N_1=2$ and $N_2=2$, the configuration information of the network device indicates that four of the $O_1O_2$ beam vector groups need to satisfy corresponding restriction rules. It is assumed that the restriction rule is that the largest value of the amplitude function of the spatial-frequency combination coefficients corresponding to the first spatial domain beam basis vector needs to be less than or equal to the threshold corresponding to the first spatial domain beam basis vector, and the amplitude function is the largest value of the quantized amplitudes of the spatial-frequency combination coefficients, in the first polarization direction, corresponding to the first spatial domain beam basis vector, in other words, the amplitude function is the reference amplitude, in the first polarization direction, corresponding to the first spatial domain beam basis vector. For $N_1N_2=4$ spatial domain beam basis vectors included in a $k^{th}$ spatial domain beam basis vector group $g^{(k)}$ in the four restricted spatial domain beam basis vector groups, the network device indicates, by using a bit sequence $B_2^{(k)}=b_2^{(k,7)}, b_2^{(k,6)} \ldots b_2^{(k,0)}=00011011$, thresholds corresponding to the $N_1N_2=4$ spatial domain beam basis vectors. Therefore, when there are two polarization directions, a largest value of amplitudes of K=8 spatial-frequency combination coefficients corresponding to the $N_1N_{2=4}$ spatial domain beam basis vectors is restricted. Indexes of the $N_1N_2$-4 spatial domain beam basis vectors are jointly encoded, by using $(x_1, x_2)$, as $V=N_1x_2+x_1$. $x_1=0,1, \ldots$, or $N_1-1$, and $x2=0, 1, \ldots$, or $N_2-1$. As shown in Table 3, a restriction threshold corresponding to a spatial domain beam basis vector whose index is V is indicated according to a predetermined rule by using two bits. An indication manner is shown in Table 3. It should be understood that the predetermined rule may be applicable to only a part of rows in Table 3, or another preset rule may be used, or a part of rows in Table 3 satisfy another preset rule.

TABLE 3

| $b_2^{(k,2(N1x2+x1)+1}b_2^{(k,2(N1x2+x1))}$ | Threshold |
| --- | --- |
| 00 | 0 |
| 01 | $\left(\frac{1}{4}\right)^{1/4}$ |
| 10 | $\left(\frac{1}{2}\right)^{1/4}$ |
| 11 | 1 |

When the amplitude of the spatial-frequency combination coefficient is the product of the reference amplitude and the differential amplitude, information about spatial-frequency combination coefficients in T spatial-frequency combination coefficient vectors includes an index of a reference amplitude in each polarization direction and an index of a differential amplitude of each of the spatial-frequency combination coefficients in the T spatial-frequency combination coefficient vectors. When the amplitude function is the largest value of the quantized amplitudes of the spatial-frequency combination coefficients, in the first polarization direction, corresponding to the first spatial domain beam basis vector, the information about the spatial-frequency combination coefficients in the T spatial-frequency combination coefficient vectors includes the index of the reference amplitude in each polarization direction, the index of the differential amplitude of each of the spatial-frequency combination coefficients in the T spatial-frequency combination coefficient vectors, and a corresponding phase index.

When the network device has a plurality of spatial layers and two polarization directions, each polarization direction corresponds to same L/2 spatial domain beam basis vectors, and L spatial domain beam basis vectors selected for each of the plurality of spatial layers are the same, K frequency domain basis vectors corresponding to each of the L spatial domain beam basis vectors are the same for each spatial layer. The network device may send the configuration information, to indicate a maximum quantity of spatial-frequency combination coefficients that need to be reported. The maximum quantity of spatial-frequency combination coefficients may be represented as [βLK$_i$], to be specific, a value obtained by rounding up a product of β, L and K$_i$. β is a proportional coefficient, of a spatial-frequency combination coefficient, configured by the network device, and available values are ¾, ½, ¼, and ⅛. It can be learned that after spatial-frequency compression, the terminal device can report a maximum of [βLK$_i$] spatial-frequency combination coefficients to the network device. In addition, when there is a spatial-frequency combination coefficient whose amplitude is 0 in the [βLK$_i$] spatial-frequency combination coefficients to be reported, the terminal device may report only spatial-frequency combination coefficients whose amplitudes are not 0 in the [βLK$_i$] spatial-frequency combination coefficients and indexes corresponding to the spatial-frequency combination coefficients, and does not need to report information about the spatial-frequency combination coefficient whose amplitude is 0. Herein, quantities K$_i$, of frequency domain basis vectors, corresponding to different spatial layers may be the same or may be different. Similarly, K$_i$ frequency domain basis vectors corresponding to different spatial layers may be the same, may be different, or may be partially the same. K$_i$ may be quantities of frequency domain basis vectors of different spatial layers. It can be learned that quantities of frequency domain basis vectors of different spatial layers may be different, and corresponding maximum quantities of spatial-frequency combination coefficients may be different. K$_i$ may alternatively be a quantity of frequency domain basis vectors of the first spatial layer in the plurality of spatial layers. It can be learned that different spatial layers correspond to a same maximum quantity of spatial-frequency combination coefficients. The indexes of the spatial-frequency combination coefficients whose amplitudes are not 0 in the [βLK$_i$] spatial-frequency combination coefficients may be indicated by using a bitmap (bitmap) corresponding to all the spatial layers.

For example, a threshold corresponding to a beam 1 (where an index is $$(x_1 = 0, x_2 = 0)) \text{ is } \left(\frac{1}{2}\right)^{1/4}.$$

For a dual polarization direction (including a polarization direction 1 and a polarization direction 2) case, same spatial domain beam basis vectors are used in the two polarization directions, a reference amplitude corresponding to a strong-polarization direction (a polarization direction including a spatial-frequency combination coefficient with a largest amplitude) is 1, and a reference amplitude corresponding to a weak-polarization direction (a polarization direction that does not include the spatial-frequency combination coefficient with the largest amplitude) is $$\left(\frac{1}{4}\right)^{1/4}.$$

If a product of a differential amplitude, in each of the two polarization directions, of each spatial-frequency combination coefficient corresponding to the beam 1 and a corresponding reference amplitude is less than or equal to $$\left(\frac{1}{2}\right)^{1/4},$$

spatial frequency combination coefficients corresponding to the beam 1 satisfy a corresponding restriction rule. Assuming that products of differential amplitudes of all spatial-frequency combination coefficients corresponding to the beam 1 and corresponding reference amplitudes include a value greater than $$\left(\frac{1}{2}\right)^{1/4},$$

the spatial-frequency combination coefficients corresponding to the beam 1 do not satisfy the corresponding restriction rule. If the beam 1 needs to be used, an amplitude of a spatial-frequency combination coefficient needs to be adjusted. Only a spatial-frequency combination coefficient, in the spatial-frequency combination coefficients corresponding to the beam 1, not satisfying the restriction rule may be adjusted to a restriction threshold; or all the spatial-frequency combination coefficients corresponding to the beam 1 may be divided by the largest amplitude of the spatial-frequency combination coefficients corresponding to the beam 1; or only a spatial-frequency combination coefficient, in the spatial-frequency combination coefficients corresponding to the beam 1, not satisfying the restriction rule may be divided by the largest amplitude of the spatial-frequency combination coefficients corresponding to the beam 1; or another adjustment manner may be used. This is not limited in this embodiment. If the beam 1 is not used, a beam may be reselected, and the beam 1 may not be selected during beam reselection.

Step 201 to step 205 may be a processing process for one spatial layer. When the network device includes a plurality of spatial layers, a processing process for each spatial layer may be the same as step 201 to step 205.

Figure 4:
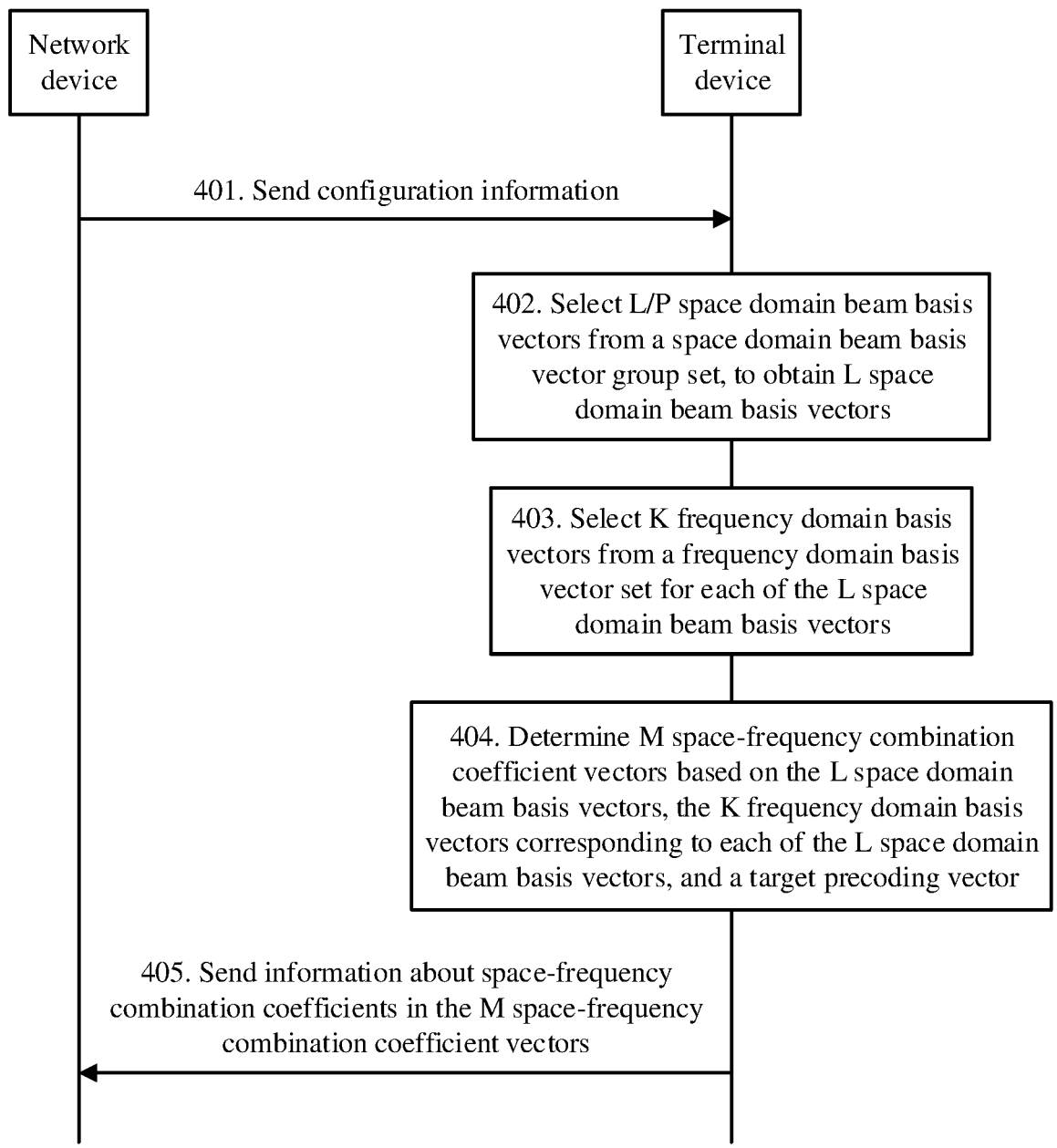
FIG. 4 is a schematic flowchart of another communication method according to an embodiment of the present invention.

Based on the network architecture shown in FIG. 1, FIG. 4 is a schematic flowchart of another communication method according to an embodiment of the present invention. As shown in FIG. 4, the communication method may include the following steps.

401. The network device sends configuration information to the terminal.

Step 401 is the same as step 201. For detailed descriptions, refer to step 201. Details are not described herein again.

402. The terminal device selects L/P spatial domain beam basis vectors from a spatial domain beam basis vector group set, to obtain L spatial domain beam basis vectors.

After receiving the configuration information from the network device, the terminal device may select the L/P spatial domain beam basis vectors from the spatial domain beam basis vector group set, to obtain the L spatial domain beam basis vectors. P is a quantity of polarization directions. To be specific, only the L/P spatial domain beam basis vectors need to be selected from the spatial domain beam basis vector group set, and the same L/P spatial domain beam basis vectors are used in the P polarization directions. This may be considered as replicating the selected L/P spatial domain beam basis vectors for P−1 times to obtain the L spatial domain beam basis vectors. One group of spatial domain beam basis vectors may be first selected from the spatial domain beam basis vector group set, in other words, one spatial domain beam basis vector group is selected from the spatial domain beam basis vector group set. Then, the L/P spatial domain beam basis vectors are selected from the group of spatial domain beam basis vectors. Another processing process is similar to step 202. For detailed descriptions, refer to step 202. Details are not described herein again.

403. The terminal device selects K frequency domain basis vectors from a frequency domain basis vector set for each of the L spatial domain beam basis vectors.

Step 403 is the same as step 203. For detailed descriptions, refer to step 203. Details are not described herein again.

404. The terminal device determines M spatial-frequency combination coefficient vectors based on the L spatial domain beam basis vectors, the K frequency domain basis vectors corresponding to each of the L spatial domain beam basis vectors, and a target precoding vector.

Step 404 is the same as step 204. For detailed descriptions, refer to step 204. Details are not described herein again.

405. The terminal device sends information about spatial-frequency combination coefficients in the M spatial-frequency combination coefficient vectors to the network device.

Step 405 is the same as step 205. For detailed descriptions, refer to step 205. Details are not described herein again.

Figure 5:
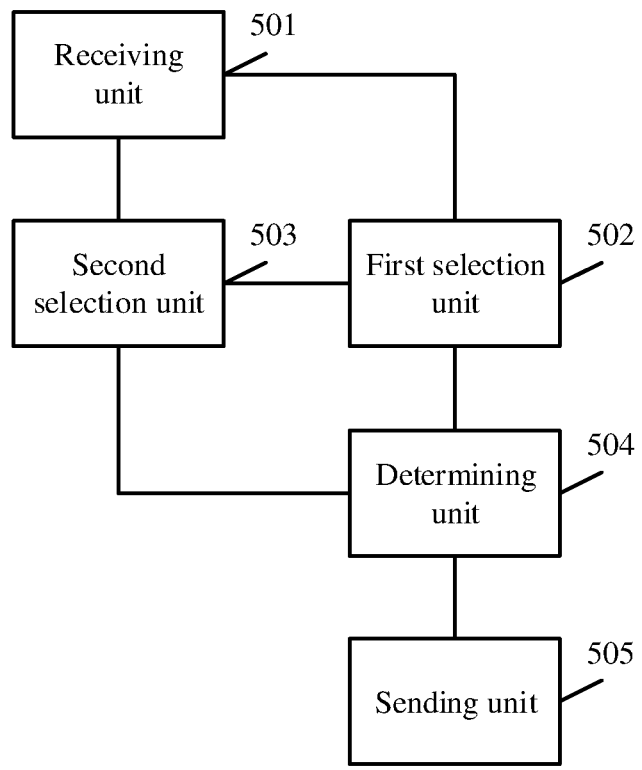
FIG. 5 is a schematic structural diagram of a terminal device according to an embodiment of the present invention.

Based on the network architecture shown in FIG. 1 and the same concept of the communication methods in the foregoing embodiments, FIG. 5 is a schematic structural diagram of a terminal device according to an embodiment of the present invention. The terminal device may be applied to the communication methods shown in FIG. 2 and FIG. 4. As shown in FIG. 5, the terminal device may include:

a receiving unit 501, configured to receive configuration information from a network device, where the configuration information indicates one or more spatial domain beam basis vector groups and Q thresholds, and the Q thresholds correspond one-to-one to spatial domain beam basis vectors in the one or more spatial domain beam basis vector groups;

a first selection unit 502, configured to select L spatial domain beam basis vectors from a spatial domain beam basis vector group set;

a second selection unit 503, configured to select K frequency domain basis vectors from a frequency domain basis vector set for each of the L spatial domain beam basis vectors selected by the first selection unit 502;

a determining unit 504, configured to determine M spatial-frequency combination coefficient vectors based on the L spatial domain beam basis vectors selected by the first selection unit 502, the K frequency domain basis vectors, selected by the second selection unit 503, corresponding to each of the L spatial domain beam basis vectors, and a target precoding vector, where one spatial-frequency combination coefficient vector corresponds to one spatial domain beam basis vector, the spatial-frequency combination coefficient vector corresponding to the spatial domain beam basis vector satisfies a restriction rule, and the restriction rule is associated with the threshold corresponding to the spatial domain beam basis vector; and a sending unit 505, configured to send, to the network device, amplitudes and phases of spatial-frequency combination coefficients in the M spatial-frequency combination coefficient vectors determined by the determining unit 504.

In a possible implementation, the restriction rule is that a value of a power function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the power function is a ratio of a first power to a second power, the first power is a power sum of the spatial-frequency combination coefficients corresponding to the first spatial domain beam basis vector, and the second power is a largest value of power sums of spatial-frequency combination coefficients corresponding to each of M spatial domain beam basis vectors.

In a possible implementation, the power function is a power sum of the spatial-frequency combination coefficients corresponding to the first spatial domain beam basis vector.

In a possible implementation, powers of the spatial-frequency combination coefficients corresponding to the first spatial domain beam basis vector may be squares of amplitudes of the spatial-frequency combination coefficients corresponding to the first spatial domain beam basis vector.

In a possible implementation, the restriction rule is that a value of an amplitude function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the amplitude function is a largest value of amplitudes of the spatial-frequency combination coefficients corresponding to the first spatial domain beam basis vector.

In a possible implementation, an amplitude of a first spatial-frequency combination coefficient may be a product of a reference amplitude and a differential amplitude; the reference amplitude may be a largest value of quantized amplitudes of spatial-frequency combination coefficients, in a first polarization direction, corresponding to the first spatial domain beam basis vector; the differential amplitude may be a ratio of a quantized amplitude of the first spatial-frequency combination coefficient to the reference amplitude; the first spatial-frequency combination coefficient is any one of the spatial-frequency combination coefficients, in the first polarization direction, corresponding to the first spatial domain beam basis vector; and the first polarization direction is any one of polarization directions of the first spatial domain beam basis vector.

In a possible implementation, the amplitude function may be a largest value of quantized amplitudes of spatial-frequency combination coefficients, in a first polarization direction, corresponding to the first spatial domain beam basis vector, and the first polarization direction is any one of polarization directions of the first spatial domain beam basis vector.

In a possible implementation, the first selection unit 502 is specifically configured to:
  select one group of spatial domain beam basis vectors from the spatial domain beam basis vector group set; and
  select the L spatial domain beam basis vectors from the group of spatial domain beam basis vectors.

In a possible implementation, when all the spatial-frequency combination coefficients are reported, the determining unit 504 is specifically configured to:
  determine M initial spatial-frequency combination coefficient vectors based on the L spatial domain beam basis vectors, the K frequency domain basis vectors corresponding to each of the L spatial domain beam basis vectors, and the target precoding vector, where M is equal to L; and when the one or more spatial domain beam basis vector groups do not include the group of spatial domain beam basis vectors, determine the M initial spatial-frequency combination coefficient vectors as the M spatial-frequency combination coefficient vectors.

In a possible implementation, when only a part of the spatial-frequency combination coefficients are reported, the determining unit 504 is specifically configured to:

determine L initial spatial-frequency combination coefficient vectors based on the L spatial domain beam basis vectors, the K frequency domain basis vectors corresponding to each of the L spatial domain beam basis vectors, and the target precoding vector;

select a part of spatial-frequency combination coefficients from the L initial spatial-frequency combination coefficient vectors to obtain M initial spatial-frequency combination coefficient vectors, where M is less than or equal to L, and a quantity of spatial-frequency combination coefficients included in each of the M initial spatial-frequency combination coefficient vectors is less than or equal to a quantity of spatial-frequency combination coefficients included in a corresponding initial spatial-frequency combination coefficient vector in the L initial spatial-frequency combination coefficient vectors; and when the one or more spatial domain beam basis vector groups do not include the group of spatial domain beam basis vectors, determine the M initial spatial-frequency combination coefficient vectors as the M spatial-frequency combination coefficient vectors.

In a possible implementation, the determining unit 504 is specifically further configured to:

when the one or more spatial domain beam basis vector groups include the group of spatial domain beam basis vectors, and spatial-frequency combination coefficients in the M initial spatial-frequency combination coefficient vectors all satisfy corresponding restriction rules, determine the M initial spatial-frequency combination coefficient vectors as the M spatial-frequency combination coefficient vectors.

In a possible implementation, the determining unit 504 is specifically further configured to:

when the one or more spatial domain beam basis vector groups include the group of spatial domain beam basis vectors, and there is a spatial-frequency combination coefficient, in the M initial spatial-frequency combination coefficient vectors, not satisfying a corresponding restriction rule, adjust an amplitude of the spatial-frequency combination coefficient not satisfying the restriction rule, to obtain the M spatial-frequency combination coefficient vectors.

In a possible implementation, when determining that the one or more spatial domain beam basis vector groups include the group of spatial domain beam basis vectors, and there is a spatial-frequency combination coefficient, in the M initial spatial-frequency combination coefficient vectors, not satisfying a corresponding restriction rule, the determining unit 504 is configured to: trigger the first selection unit 502 to select the L spatial domain beam basis vectors from the spatial domain beam basis vector group set; trigger the second selection unit 503 to select the K frequency domain basis vectors from the frequency domain basis vector set for each of the L spatial domain beam basis vectors; and determine the M spatial-frequency combination coefficient vectors based on the L spatial domain beam basis vectors, the K frequency domain basis vectors corresponding to each of the L spatial domain beam basis vectors, and the target precoding vector.

In a possible implementation, the configuration information further indicates a quantity of spatial-frequency combination coefficients, and a quantity of spatial-frequency combination coefficients included in the M spatial-frequency combination coefficient vectors is equal to the quantity of spatial-frequency combination coefficients.

In a possible implementation, the sending unit 505 is specifically configured to send, to the network device, the amplitudes and the phases of the spatial-frequency combination coefficients in the M spatial-frequency combination coefficient vectors and a quantity of spatial-frequency combination coefficients included in the M spatial-frequency combination coefficient vectors.

In a possible implementation, the sending unit 505 is specifically configured to send, to the network device, the amplitudes and the phases of the spatial-frequency combination coefficients in the M spatial-frequency combination coefficient vectors, basis vector indexes of the L spatial domain beam basis vectors, and basis vector indexes of the K frequency domain basis vectors corresponding to each of the L spatial domain beam basis vectors.

For more-detailed descriptions of the receiving unit 501, the first selection unit 502, the second selection unit 503, the determining unit 504, and the sending unit 505, directly refer to the related descriptions of the terminal device in the method embodiments shown in FIG. 2 and FIG. 4, and details are not described herein again.

Figure 6:
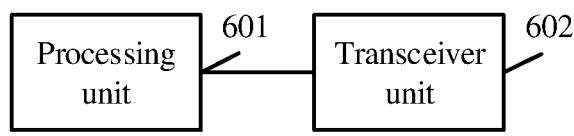
FIG. 6 is a schematic structural diagram of a network device according to an embodiment of the present invention.

Based on the network architecture shown in FIG. 1 and the same concept of the communication methods in the foregoing embodiments, FIG. 6 is a schematic structural diagram of a network device according to an embodiment of the present invention. The network device may be applied to the communication methods shown in FIG. 2 and FIG. 4. As shown in FIG. 6, the network device may include a processing unit 601 and a transceiver unit 602. The processing unit 601 is configured to:

control the transceiver unit 602 to send configuration information to a terminal device, where the configuration information indicates one or more spatial domain beam basis vector groups and Q thresholds, and the Q thresholds correspond one-to-one to spatial domain beam basis vectors in the one or more spatial domain beam basis vector groups; and control the transceiver unit 602 to receive amplitudes and phases of spatial-frequency combination coefficients in M spatial-frequency combination coefficient vectors from the terminal device, where the M spatial-frequency combination coefficient vectors are determined based on L spatial domain beam basis vectors, K frequency domain basis vectors corresponding to each of the L spatial domain beam basis vectors, and a target precoding vector, the L spatial domain beam basis vectors are selected from a spatial domain beam basis vector group set, the K frequency domain basis vectors are selected from a frequency domain basis vector set, one spatial-frequency combination coefficient vector corresponds to one spatial domain beam basis vector, the spatial-frequency combination coefficient vector corresponding to the spatial domain beam basis vector satisfies a restriction rule, and the restriction rule is associated with the threshold corresponding to the spatial domain beam basis vector.

In a possible implementation, the restriction rule is that a value of a power function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the power function is a ratio of a first power to a second power, the first power is a power sum of the spatial-frequency combination coefficients corresponding to the first spatial domain beam basis vector, and the second power is a largest value of power sums of spatial-frequency combination coefficients corresponding to each of M spatial domain beam basis vectors.

In a possible implementation, the power function is a power sum of the spatial-frequency combination coefficients corresponding to the first spatial domain beam basis vector.

In a possible implementation, powers of the spatial-frequency combination coefficients corresponding to the first spatial domain beam basis vector may be squares of amplitudes of the spatial-frequency combination coefficients corresponding to the first spatial domain beam basis vector.

In a possible implementation, the restriction rule is that a value of an amplitude function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the amplitude function is a largest value of amplitudes of the spatial-frequency combination coefficients corresponding to the first spatial domain beam basis vector.

In a possible implementation, an amplitude of a first spatial-frequency combination coefficient may be a product of a reference amplitude and a differential amplitude; the reference amplitude may be a largest value of quantized amplitudes of spatial-frequency combination coefficients, in a first polarization direction, corresponding to the first spatial domain beam basis vector; the differential amplitude may be a ratio of a quantized amplitude of the first spatial-frequency combination coefficient to the reference amplitude; the first spatial-frequency combination coefficient is any one of the spatial-frequency combination coefficients, in the first polarization direction, corresponding to the first spatial domain beam basis vector; and the first polarization direction is any one of polarization directions of the first spatial domain beam basis vector.

In a possible implementation, the amplitude function may be a largest value of quantized amplitudes of spatial-frequency combination coefficients, in a first polarization direction, corresponding to the first spatial domain beam basis vector, and the first polarization direction is any one of polarization directions of the first spatial domain beam basis vector.

In a possible implementation, when the terminal device reports only a part of the spatial-frequency combination coefficients, the configuration information further indicates a quantity of spatial-frequency combination coefficients, and a quantity of spatial-frequency combination coefficients included in the M spatial-frequency combination coefficient vectors is equal to the quantity of spatial-frequency combination coefficients.

In a possible implementation, when the terminal device reports only a part of the spatial-frequency combination coefficients, that the transceiver unit 602 receives amplitudes and phases of spatial-frequency combination coefficients in M spatial-frequency combination coefficient vectors from the terminal device includes:

receiving, from the terminal device, the amplitudes and the phases of the spatial-frequency combination coefficients in the M spatial-frequency combination coefficient vectors and a quantity of spatial-frequency combination coefficients included in the M spatial-frequency combination coefficient vectors.

In a possible implementation, that the transceiver unit 602 receives amplitudes and phases of spatial-frequency combination coefficients in M spatial-frequency combination coefficient vectors from the terminal device includes:

receiving, from the terminal device, the amplitudes and the phases of the spatial-frequency combination coefficients in the M spatial-frequency combination coefficient vectors, basis vector indexes of the L spatial domain beam basis vectors, and basis vector indexes of the K frequency domain basis vectors corresponding to each of the L spatial domain beam basis vectors.

For more-detailed descriptions of the processing unit 601 and the transceiver unit 602, directly refer to the related descriptions of the network device in the method embodiments shown in FIG. 2 and FIG. 4, and details are not described herein again.

Figure 7:
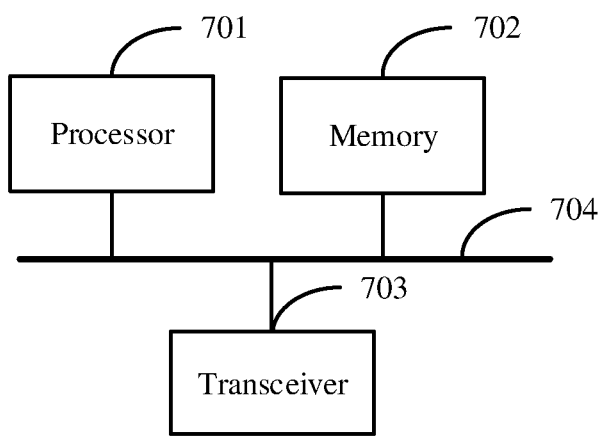
FIG. 7 is a schematic structural diagram of a communications apparatus according to an embodiment of the present invention.

Based on the network architecture described in FIG. 1, FIG. 7 is a schematic structural diagram of a communications apparatus according to an embodiment of the present invention. As shown in FIG. 7, the communications apparatus may include a processor 701, a memory 702, a transceiver 703, and a bus 704. The processor 701 may be a general-purpose central processing unit (CPU), a plurality of CPUs, a microprocessor, an application-specific integrated circuit (application-specific integrated circuit, ASIC), or one or more integrated circuits that are configured to control program execution of solutions in the present invention. The memory 702 may be a read-only memory (read-only memory, ROM) or another type of static storage device that can store static information and an instruction, or a random access memory (random access memory, RAM) or another type of dynamic storage device that can store information and an instruction; or may be an electrically erasable programmable read-only memory (Electrically Erasable Programmable Read-Only Memory, EEPROM), a compact disc read-only memory (Compact Disc Read-Only Memory, CD-ROM) or other compact disc storage, optical disc storage (including a compact disc, a laser disc, an optical disc, a digital versatile disc, a Blu-ray disc, or the like), a disk storage medium or another disk storage device, or any other computer-accessible medium that can be used to carry or store expected program code that is in an instruction form or in a data structure form, but is not limited thereto. The memory 702 may exist alone, or may be integrated into the processor 701. The bus 704 is connected to the processor 701. The bus 704 may include a path for transmitting information between the foregoing components. The transceiver 703 may be a transceiver antenna, or may be another transceiver component, for example, a radio frequency transceiver or a signal transceiver interface.

In an embodiment, the communications apparatus may be a terminal device or a chip in a terminal device.

The transceiver 703 is configured to receive configuration information from a network device, where the configuration information indicates one or more spatial domain beam basis vector groups and Q thresholds, and the Q thresholds correspond one-to-one to spatial domain beam basis vectors in the one or more spatial domain beam basis vector groups.

The memory 702 stores a set of program code, and the processor 701 is configured to invoke the program code stored in the memory 702 to perform the following operations:
- selecting L spatial domain beam basis vectors from a spatial domain beam basis vector group set;
- selecting K frequency domain basis vectors from a frequency domain basis vector set for each of the L spatial domain beam basis vectors; and
- determining M spatial-frequency combination coefficient vectors based on the L spatial domain beam basis vectors, the K frequency domain basis vectors corresponding to each of the L spatial domain beam basis vectors, and a target precoding vector, where one spatial-frequency combination coefficient vector corresponds to one spatial domain beam basis vector, the spatial-frequency combination coefficient vector corresponding to the spatial domain beam basis vector satisfies a restriction rule, and the restriction rule is associated with the threshold corresponding to the spatial domain beam basis vector.

The transceiver 703 is further configured to send, to the network device, amplitudes and phases of spatial-frequency combination coefficients in the M spatial-frequency combination coefficient vectors.

In a possible implementation, the restriction rule is that a value of a power function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the power function is a ratio of a first power to a second power, the first power is a power sum of the spatial-frequency combination coefficients corresponding to the first spatial domain beam basis vector, and the second power is a largest value of power sums of spatial-frequency combination coefficients corresponding to each of M spatial domain beam basis vectors.

In a possible implementation, the power function is a power sum of the spatial-frequency combination coefficients corresponding to the first spatial domain beam basis vector.

In a possible implementation, powers of the spatial-frequency combination coefficients corresponding to the first spatial domain beam basis vector may be squares of amplitudes of the spatial-frequency combination coefficients corresponding to the first spatial domain beam basis vector.

In a possible implementation, the restriction rule is that a value of an amplitude function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the amplitude function is a largest value of amplitudes of the spatial-frequency combination coefficients corresponding to the first spatial domain beam basis vector.

In a possible implementation, an amplitude of a first spatial-frequency combination coefficient may be a product of a reference amplitude and a differential amplitude; the reference amplitude may be a largest value of quantized amplitudes of spatial-frequency combination coefficients, in a first polarization direction, corresponding to the first spatial domain beam basis vector; the differential amplitude may be a ratio of a quantized amplitude of the first spatial-frequency combination coefficient to the reference amplitude; the first spatial-frequency combination coefficient is any one of the spatial-frequency combination coefficients, in the first polarization direction, corresponding to the first spatial domain beam basis vector; and the first polarization direction is any one of polarization directions of the first spatial domain beam basis vector.

In a possible implementation, the amplitude function may be a largest value of quantized amplitudes of spatial-frequency combination coefficients, in a first polarization direction, corresponding to the first spatial domain beam basis vector, and the first polarization direction is any one of polarization directions of the first spatial domain beam basis vector.

In a possible implementation, that the processor 701 selects L spatial domain beam basis vectors from a spatial domain beam basis vector group set includes:
- selecting one group of spatial domain beam basis vectors from the spatial domain beam basis vector group set; and
- selecting the L spatial domain beam basis vectors from the group of spatial domain beam basis vectors.

In a possible implementation, when all the spatial-frequency combination coefficients are reported, that the processor 701 determines M spatial-frequency combination coefficient vectors based on the L spatial domain beam basis vectors, the K frequency domain basis vectors corresponding to each of the L spatial domain beam basis vectors, and a target precoding vector includes:
- determining M initial spatial-frequency combination coefficient vectors based on the L spatial domain beam basis vectors, the K frequency domain basis vectors corresponding to each of the L spatial domain beam basis vectors, and the target precoding vector, where M is equal to L; and
- when the one or more spatial domain beam basis vector groups do not include the group of spatial domain beam basis vectors, determining the M initial spatial-frequency combination coefficient vectors as the M spatial-frequency combination coefficient vectors.

In a possible implementation, when only a part of spatial-frequency combination coefficients are reported, that the processor 701 determines M spatial-frequency combination coefficient vectors based on the L spatial domain beam basis vectors, the K frequency domain basis vectors corresponding to each of the L spatial domain beam basis vectors, and a target precoding vector includes:
- determining L initial spatial-frequency combination coefficient vectors based on the L spatial domain beam basis vectors, the K frequency domain basis vectors corresponding to each of the L spatial domain beam basis vectors, and the target precoding vector;
- selecting a part of spatial-frequency combination coefficients from the L initial spatial-frequency combination coefficient vectors to obtain M initial spatial-frequency combination coefficient vectors, where M is less than or equal to L, and a quantity of spatial-frequency combination coefficients included in each of the M initial spatial-frequency combination coefficient vectors is less than or equal to a quantity of spatial-frequency combination coefficients included in a corresponding initial spatial-frequency combination coefficient vector in the L initial spatial-frequency combination coefficient vectors; and when the one or more spatial domain beam basis vector groups do not include the group of spatial domain beam basis vectors, determining the M initial spatial-frequency combination coefficient vectors as the M spatial-frequency combination coefficient vectors.

In a possible implementation, that the processor 701 determines M spatial-frequency combination coefficient vectors based on the L spatial domain beam basis vectors, the K frequency domain basis vectors corresponding to each of the L spatial domain beam basis vectors, and a target precoding vector further includes:

when the one or more spatial domain beam basis vector groups include the group of spatial domain beam basis vectors, and spatial-frequency combination coefficients in the M initial spatial-frequency combination coefficient vectors all satisfy corresponding restriction rules, determining the M initial spatial-frequency combination coefficient vectors as the M spatial-frequency combination coefficient vectors.

In a possible implementation, that the processor 701 determines M spatial-frequency combination coefficient vectors based on the L spatial domain beam basis vectors, the K frequency domain basis vectors corresponding to each of the L spatial domain beam basis vectors, and a target precoding vector further includes:

when the one or more spatial domain beam basis vector groups include the group of spatial domain beam basis vectors, and there is a spatial-frequency combination coefficient, in the M initial spatial-frequency combination coefficient vectors, not satisfying a corresponding restriction rule, adjusting an amplitude of the spatial-frequency combination coefficient not satisfying the restriction rule, to obtain the M spatial-frequency combination coefficient vectors.

In a possible implementation, that the processor 701 determines M spatial-frequency combination coefficient vectors based on the L spatial domain beam basis vectors, the K frequency domain basis vectors corresponding to each of the L spatial domain beam basis vectors, and a target precoding vector further includes:

when the one or more spatial domain beam basis vector groups include the group of spatial domain beam basis vectors, and there is a spatial-frequency combination coefficient, in the M initial spatial-frequency combination coefficient vectors, not satisfying a corresponding restriction rule, selecting L spatial domain beam basis vectors from the spatial domain beam basis vector group set, selecting K frequency domain basis vectors from the frequency domain basis vector set for each of the L spatial domain beam basis vectors, and determining M spatial-frequency combination coefficient vectors based on the L spatial domain beam basis vectors, the K frequency domain basis vectors corresponding to each of the L spatial domain beam basis vectors, and the target precoding vector.

In a possible implementation, the configuration information further indicates a quantity of spatial-frequency combination coefficients, and a quantity of spatial-frequency combination coefficients included in the M spatial-frequency combination coefficient vectors is equal to the quantity of spatial-frequency combination coefficients.

In a possible implementation, that the transceiver 703 sends amplitudes and phases of spatial-frequency combination coefficients in M spatial-frequency combination coefficient vectors to the network device includes:

sending, to the network device, the amplitudes and the phases of the spatial-frequency combination coefficients in the M spatial-frequency combination coefficient vectors and a quantity of spatial-frequency combination coefficients included in the M spatial-frequency combination coefficient vectors.

In a possible implementation, that the transceiver 703 sends amplitudes and phases of spatial-frequency combination coefficients in M spatial-frequency combination coefficient vectors to the network device includes:

sending, to the network device, the amplitudes and the phases of the spatial-frequency combination coefficients in the M spatial-frequency combination coefficient vectors, basis vector indexes of the L spatial domain beam basis vectors, and basis vector indexes of the K frequency domain basis vectors corresponding to each of the L spatial domain beam basis vectors.

Step 202 to step 204 and step 402 to step 404 may be performed by the processor 701 and the memory 702 in the terminal device. The steps of receiving the configuration information on the terminal device side in step 201 and step 401, step 205, and step 405 may be performed by the transceiver 703 in the terminal device.

The first selection unit 502, the second selection unit 503, and the determining unit 504 may be implemented by the processor 701 and the memory 702 in the terminal device, and the receiving unit 501 and the sending unit 505 may be implemented by the transceiver 703 in the terminal device.

The terminal device may further be configured to implement the methods performed by the terminal device in the foregoing method embodiments, and details are not described herein again.

In another embodiment, the communications apparatus may be a network device or a chip in a network device.

The memory 702 stores a set of program code, and the processor 701 is configured to invoke the program code stored in the memory 702, to control the transceiver 703 to perform the following operations:

sending configuration information to a terminal device, where the configuration information indicates one or more spatial domain beam basis vector groups and Q thresholds, and the Q thresholds correspond one-to-one to spatial domain beam basis vectors in the one or more spatial domain beam basis vector groups; and receiving amplitudes and phases of spatial-frequency combination coefficients in M spatial-frequency combination coefficient vectors from the terminal device, where the M spatial-frequency combination coefficient vectors are determined based on L spatial domain beam basis vectors, K frequency domain basis vectors corresponding to each of the L spatial domain beam basis vectors, and a target precoding vector, the L spatial domain beam basis vectors are selected from a spatial domain beam basis vector group set, the K frequency domain basis vectors are selected from a frequency domain basis vector set, one spatial-frequency combination coefficient vector corresponds to one spatial domain beam basis vector, the spatial-frequency combination coefficient vector corresponding to the spatial domain beam basis vector satisfies a restriction rule, and the restriction rule is associated with the threshold corresponding to the spatial domain beam basis vector.

In a possible implementation, the restriction rule is that a value of a power function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the power function is a ratio of a first power to a second power, the first power is a power sum of the spatial-frequency combination coefficients corresponding to the first spatial domain beam basis vector, and the second power is a largest value of power sums of spatial-frequency combination coefficients corresponding to each of M spatial domain beam basis vectors.

In a possible implementation, the power function is a power sum of the spatial-frequency combination coefficients corresponding to the first spatial domain beam basis vector.

In a possible implementation, powers of the spatial-frequency combination coefficients corresponding to the first spatial domain beam basis vector may be squares of amplitudes of the spatial-frequency combination coefficients corresponding to the first spatial domain beam basis vector.

In a possible implementation, the restriction rule is that a value of an amplitude function of spatial-frequency combination coefficients corresponding to a first spatial domain beam basis vector needs to be less than or equal to a threshold corresponding to the first spatial domain beam basis vector, and the first spatial domain beam basis vector is any spatial domain beam basis vector in the one or more spatial domain beam basis vector groups.

In a possible implementation, the amplitude function is a largest value of amplitudes of the spatial-frequency combination coefficients corresponding to the first spatial domain beam basis vector.

In a possible implementation, an amplitude of a first spatial-frequency combination coefficient may be a product of a reference amplitude and a differential amplitude; the reference amplitude may be a largest value of quantized amplitudes of spatial-frequency combination coefficients, in a first polarization direction, corresponding to the first spatial domain beam basis vector; the differential amplitude may be a ratio of a quantized amplitude of the first spatial-frequency combination coefficient to the reference amplitude; the first spatial-frequency combination coefficient is any one of the spatial-frequency combination coefficients, in the first polarization direction, corresponding to the first spatial domain beam basis vector; and the first polarization direction is any one of polarization directions of the first spatial domain beam basis vector.

In a possible implementation, the amplitude function may be a largest value of quantized amplitudes of spatial-frequency combination coefficients, in a first polarization direction, corresponding to the first spatial domain beam basis vector, and the first polarization direction is any one of polarization directions of the first spatial domain beam basis vector.

In a possible implementation, when the terminal device reports only a part of the spatial-frequency combination coefficients, the configuration information further indicates a quantity of spatial-frequency combination coefficients, and a quantity of spatial-frequency combination coefficients included in the M spatial-frequency combination coefficient vectors is equal to the quantity of spatial-frequency combination coefficients.

In a possible implementation, when the terminal device reports only a part of the spatial-frequency combination coefficients, that the transceiver 703 receives amplitudes and phases of spatial-frequency combination coefficients in M spatial-frequency combination coefficient vectors from the terminal device includes:

receiving, from the terminal device, the amplitudes and the phases of the spatial-frequency combination coefficients in the M spatial-frequency combination coefficient vectors and a quantity of spatial-frequency combination coefficients included in the M spatial-frequency combination coefficient vectors.

In a possible implementation, that the transceiver 703 receives amplitudes and phases of spatial-frequency combination coefficients in M spatial-frequency combination coefficient vectors from the terminal device includes:

receiving, from the terminal device, the amplitudes and the phases of the spatial-frequency combination coefficients in the M spatial-frequency combination coefficient vectors, basis vector indexes of the L spatial domain beam basis vectors, and basis vector indexes of the K frequency domain basis vectors corresponding to each of the L spatial domain beam basis vectors.

Step 201, step 401, and the steps of receiving the amplitudes and the phases of the spatial-frequency combination coefficients on the network device side in step 205 and step 405 may be performed by the processor 701, the memory 702, and the transceiver 703 in the network device.

The processing unit 601 and the transceiver unit 602 may be implemented by the processor 701, the memory 702, and the transceiver 703 in the network device.

The network device may further be configured to implement the methods performed by the network device in the foregoing method embodiments, and details are not described herein again.

An embodiment of the present invention further discloses a readable storage medium. The readable storage medium stores a program, and when the program runs, the communication methods shown in FIG. 2 and FIG. 4 are implemented.

A person skilled in the art should be aware that in the foregoing one or more examples, functions described in the present invention may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another place. The storage medium may be any available medium accessible to a general-purpose or special-purpose computer.

Another embodiment of this application further provides a computer program product. The computer program product includes a computer instruction stored in the foregoing computer-readable storage medium.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Based on the technical solutions of the present invention, any modification, equivalent replacement, and improvement made shall fall within the protection scope of the present invention.

What is claimed is:

1. A method for communication, comprising:
sending configuration information to a terminal device, wherein the configuration information indicates one or more space domain beam basis vector groups and Q thresholds, and the Q thresholds correspond one-to-one to space domain beam basis vectors in the one or more space domain beam basis vector groups; and receiving amplitudes and phases of space-frequency combination coefficients in M space-frequency combination coefficient vectors from the terminal device, wherein the M space-frequency combination coefficient vectors are determined based on L space domain beam basis vectors, K frequency domain basis vectors corresponding to each of the L space domain beam basis vectors, and a target precoding vector, and wherein:

the L space domain beam basis vectors are selected from a space domain beam basis vector group set, the K frequency domain basis vectors are selected from a frequency domain basis vector set, one space-frequency combination coefficient vector corresponds to one space domain beam basis vector, the space-frequency combination coefficient vector corresponding to the space domain beam basis vector satisfies a restriction rule, and the restriction rule is associated with a threshold corresponding to the space domain beam basis vector.

2. The method according to claim 1, wherein the restriction rule is that a value of a power function of space-frequency combination coefficients corresponding to a first space domain beam basis vector is less than or equal to a threshold corresponding to the first space domain beam basis vector, and wherein the first space domain beam basis vector is any space domain beam basis vector in the one or more space domain beam basis vector groups.

3. The method according to claim 1, wherein the restriction rule is that a value of a power function of space-frequency combination coefficients corresponding to a first space domain beam basis vector is less than or equal to a square of a threshold corresponding to the first space domain beam basis vector, and wherein the first space domain beam basis vector is any space domain beam basis vector in the one or more space domain beam basis vector groups.

4. The method according to claim 1, wherein the restriction rule is that a value of a power function of space-frequency combination coefficients corresponding to a first space domain beam basis vector is less than or equal to a linear combination of a fixed value and a square of a threshold corresponding to the first space domain beam basis vector, and wherein the first space domain beam basis vector is any space domain beam basis vector in the one or more space domain beam basis vector groups.

5. The method according to claim 2, wherein the power function is a power sum of the space-frequency combination coefficients corresponding to the first space domain beam basis vector.

6. The method according to claim 5, wherein powers of the space-frequency combination coefficients corresponding to the first space domain beam basis vector are squares of amplitudes of the space-frequency combination coefficients corresponding to the first space domain beam basis vector.

7. The method according to claim 2, wherein the threshold corresponding to the first space domain beam basis vector is 0, $\sqrt{1/4}$, $\sqrt{1/2}$, or 1.

8. The method according to claim 2, wherein:

an amplitude of a first space-frequency combination coefficient is a product of a reference amplitude and a differential amplitude;

the reference amplitude is a largest value of quantized amplitudes of space-frequency combination coefficients, in a first polarization direction, corresponding to the first space domain beam basis vector;

the differential amplitude is a ratio of a quantized amplitude of the first space-frequency combination coefficient to the reference amplitude;

the first space-frequency combination coefficient is any one of the space-frequency combination coefficients, in the first polarization direction, corresponding to the first space domain beam basis vector; and the first polarization direction is any one of polarization directions of the first space domain beam basis vector.

9. The method according to claim 1, wherein the receiving amplitudes and phases of space-frequency combination coefficients in M space-frequency combination coefficient vectors from the terminal device comprises:

receiving, from the terminal device, the amplitudes and the phases of the space-frequency combination coefficients in the M space-frequency combination coefficient vectors, basis vector indexes of the L space domain beam basis vectors, and basis vector indexes of the K frequency domain basis vectors corresponding to each of the L space domain beam basis vectors.

10. An apparatus for communications, comprising:
one or more processors;
one or more memories; and
a transceiver, wherein:

the one or more memories store programming instructions for execution by the one or more processors to:

control the transceiver to send configuration information to a terminal device, wherein the configuration information indicates one or more space domain beam basis vector groups and Q thresholds, and the Q thresholds correspond one-to-one to space domain beam basis vectors in the one or more space domain beam basis vector groups; and control the transceiver to receive amplitudes and phases of space-frequency combination coefficients in M space-frequency combination coefficient vectors from the terminal device, wherein the M space-frequency combination coefficient vectors are determined based on L space domain beam basis vectors, K frequency domain basis vectors corresponding to each of the L space domain beam basis vectors, and a target precoding vector, and wherein:

the L space domain beam basis vectors are selected from a space domain beam basis vector group set, the K frequency domain basis vectors are selected from a frequency domain basis vector set, one space-frequency combination coefficient vector corresponds to one space domain beam basis vector, the space-frequency combination coefficient vector corresponding to the space domain beam basis vector satisfies a restriction rule, and the restriction rule is associated with a threshold corresponding to the space domain beam basis vector.

11. The apparatus according to claim 10, wherein the restriction rule is that a value of a power function of space-frequency combination coefficients corresponding to a first space domain beam basis vector is less than or equal to a threshold corresponding to the first space domain beam basis vector, and wherein the first space domain beam basis vector is any space domain beam basis vector in the one or more space domain beam basis vector groups.

12. The apparatus according to claim 10, wherein the restriction rule is that a value of a power function of space-frequency combination coefficients corresponding to a first space domain beam basis vector is less than or equal to a square of a threshold corresponding to the first space domain beam basis vector, and wherein the first space domain beam basis vector is any space domain beam basis vector in the one or more space domain beam basis vector groups.

13. The apparatus according to claim 10, wherein the restriction rule is that a value of a power function of space-frequency combination coefficients corresponding to a first space domain beam basis vector is less than or equal to a linear combination of a fixed value and a square of a threshold corresponding to the first space domain beam basis vector, and wherein the first space domain beam basis vector is any space domain beam basis vector in the one or more space domain beam basis vector groups.

14. The apparatus according to claim 11, wherein the power function is a power sum of the space-frequency combination coefficients corresponding to the first space domain beam basis vector.

15. The apparatus according to claim 14, wherein powers of the space-frequency combination coefficients corresponding to the first space domain beam basis vector are squares of amplitudes of the space-frequency combination coefficients corresponding to the first space domain beam basis vector.

16. The apparatus according to claim 11, wherein the threshold corresponding to the first space domain beam basis vector is 0, $\sqrt{1/4}$, $\sqrt{1/2}$, or 1.

17. The apparatus according to claim 15, wherein:
an amplitude of a first space-frequency combination coefficient is a product of a reference amplitude and a differential amplitude;
the reference amplitude is a largest value of quantized amplitudes of space-frequency combination coefficients, in a first polarization direction, corresponding to the first space domain beam basis vector;
the differential amplitude is a ratio of a quantized amplitude of the first space-frequency combination coefficient to the reference amplitude;
the first space-frequency combination coefficient is any one of the space-frequency combination coefficients, in the first polarization direction, corresponding to the first space domain beam basis vector; and
the first polarization direction is any one of polarization directions of the first space domain beam basis vector.

18. The apparatus according to claim 10, wherein that the transceiver receives amplitudes and phases of space-frequency combination coefficients in M space-frequency combination coefficient vectors from the terminal device comprises:
receiving, from the terminal device, the amplitudes and the phases of the space-frequency combination coefficients in the M space-frequency combination coefficient vectors, basis vector indexes of the L space domain beam basis vectors, and basis vector indexes of the K frequency domain basis vectors corresponding to each of the L space domain beam basis vectors.

19. A non-transitory computer-readable storage medium, wherein the non-transitory computer-readable storage medium stores a program for execution by at least one processor to:
send configuration information, wherein the configuration information indicates one or more space domain beam basis vector groups and Q thresholds, and the Q thresholds correspond one-to-one to space domain beam basis vectors in the one or more space domain beam basis vector groups; and
receive amplitudes and phases of space-frequency combination coefficients in M space-frequency combination coefficient vectors, wherein the M space-frequency combination coefficient vectors are determined based on L space domain beam basis vectors, K frequency domain basis vectors corresponding to each of the L space domain beam basis vectors, and a target precoding vector, and wherein:
the L space domain beam basis vectors are selected from a space domain beam basis vector group set, the K frequency domain basis vectors are selected from a frequency domain basis vector set,
one space-frequency combination coefficient vector corresponds to one space domain beam basis vector, the space-frequency combination coefficient vector corresponding to the space domain beam basis vector satisfies a restriction rule, and the restriction rule is associated with a threshold corresponding to the space domain beam basis vector.

20. The non-transitory computer-readable storage medium according to claim 19, wherein the restriction rule is that a value of a power function of space-frequency combination coefficients corresponding to a first space domain beam basis vector is less than or equal to a threshold corresponding to the first space domain beam basis vector, and wherein the first space domain beam basis vector is any space domain beam basis vector in the one or more space domain beam basis vector groups.

* * * * *